(12) United States Patent
Antonopoulos et al.

(10) Patent No.: US 10,210,266 B2
(45) Date of Patent: Feb. 19, 2019

(54) DATABASE QUERY PROCESSING ON ENCRYPTED DATA

(71) Applicant: Microsoft Technology Licensing, LLC, Redmond, WA (US)

(72) Inventors: Panagiotis Antonopoulos, Redmond, WA (US); Kapil Vaswani, London (GB); Krishna Nibhanupudi, Seattle, WA (US); Neerumalla Bala Rama Koteswara Rao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 436 days.

(21) Appl. No.: 15/164,369

(22) Filed: May 25, 2016

(65) Prior Publication Data

US 2017/0344646 A1  Nov. 30, 2017

(51) Int. Cl.
*G06F 17/30* (2006.01)
*H04L 9/14* (2006.01)
(Continued)

(52) U.S. Cl.
CPC .. *G06F 17/30867* (2013.01); *G06F 17/30339* (2013.01); *G06F 17/30442* (2013.01);
(Continued)

(58) Field of Classification Search
CPC ... H04L 63/0428; H04L 63/06; H04L 63/205; H04L 9/14; H04L 9/008; G06F 17/30867; G06F 17/30339; G06F 17/30442
See application file for complete search history.

(56) References Cited

U.S. PATENT DOCUMENTS 6,029,160 A * 2/2000 Cabrera ............ G06F 17/30067
6,356,887 B1 * 3/2002 Berenson .......... G06F 17/30433
(Continued)

OTHER PUBLICATIONS

Kaul, Akshar, "Query Processing in Encrypted Cloud Databases", In Master's Thesis, Jul. 2013, 72 pages.
(Continued)

*Primary Examiner* — Saleh Najjar
*Assistant Examiner* — Devin E Almeida
(74) *Attorney, Agent, or Firm* — Fiala & Weaver P.L.L.C.

(57) ABSTRACT

Methods, systems, apparatuses, and computer program products are provided for secure handling of queries by a data server and a database application. A parameterized query is received from a client. Table column metadata is loaded for one or more table columns referenced by the parameterized query. Datatypes of expressions in the parameterized query are derived with any parameters and variables of the parameterized query indicated as having unknown datatypes. Unsupported datatype conversions in the parameterized query are determined. An encryption scheme is inferred for any parameters and variables to generate an inferred encryption scheme set. The datatypes of expressions in the parameterized query are re-derived with any parameters and variables having their inferred encryption schemes. Encryption key metadata corresponding to the inferred encryption scheme set is loaded. An encryption configuration is transmitted to the client that includes the inferred encryption scheme for any parameters and variables.

20 Claims, 12 Drawing Sheets

(51) Int. Cl.
H04L 9/00 (2006.01)
H04L 29/06 (2006.01)

(52) U.S. Cl.
CPC ............... H04L 9/008 (2013.01); H04L 9/14 (2013.01); H04L 63/0428 (2013.01); H04L 63/06 (2013.01); H04L 63/205 (2013.01)

(56) References Cited

U.S. PATENT DOCUMENTS

| | | | | |
|---|---|---|---|---|
| 6,453,325 | B1* | 9/2002 | Cabrera | G06F 11/1461 |
| 7,395,437 | B2 | 7/2008 | Agrawal et al. | |
| 8,627,107 | B1* | 1/2014 | Kennedy | G06F 21/62 380/28 |
| 9,087,212 | B2 | 7/2015 | Balakrishnan et al. | |
| 9,213,764 | B2 | 12/2015 | Kerschbaum et al. | |
| 9,349,023 | B2* | 5/2016 | Mori | G06F 17/30289 |
| 2005/0273772 | A1* | 12/2005 | Matsakis | G06F 8/41 717/136 |
| 2007/0136443 | A1* | 6/2007 | Sah | G06F 17/30867 709/219 |
| 2007/0150478 | A1* | 6/2007 | Cho | H04L 29/12113 |
| 2008/0208743 | A1* | 8/2008 | Arthur | G06Q 20/105 705/41 |
| 2009/0100033 | A1* | 4/2009 | Kim | G06F 21/6227 |
| 2011/0167056 | A1* | 7/2011 | Khanolkar | G06F 17/30433 707/718 |
| 2013/0191650 | A1* | 7/2013 | Balakrishnan | G06F 21/6227 713/190 |
| 2014/0075004 | A1* | 3/2014 | Van Dusen | H04L 41/04 709/223 |
| 2014/0281512 | A1 | 9/2014 | Arasu et al. | |
| 2014/0281578 | A1* | 9/2014 | Bennison | G06F 21/6227 713/189 |
| 2015/0095252 | A1* | 4/2015 | Mattsson | H04L 9/06 705/325 |
| 2015/0244517 | A1 | 8/2015 | Nita | |
| 2015/0295716 | A1 | 10/2015 | Liu | |
| 2016/0055348 | A1* | 2/2016 | Lewak | G06F 21/6227 713/193 |

OTHER PUBLICATIONS

Refaie, et al., "A Secure Algorithm for Executing Queries over Encrypted Data", In Proceedings of Third World Conference on Complex Systems, Nov. 23, 2015, 6 pages.

S, et al., "A Secure and Efficient Way of Accessing Encrypted Cloud Databases Using Adaptive Encryption Scheme" In International Journal of Science and Research, vol. 4, Issue 3, Mar. 2015, pp. 1074-1077.

Tu, et al., "Processing Analytical Queries over Encrypted Data", In Proceedings of the VLDB Endowment, vol. 6, Issue 5, Aug. 26, 2013, pp. 1-12.

Mani, Murali, "Enabling Secure Query Processing in the Cloud using Fully Homomorphic Encryption", In Proceedings of the Second Workshop on Data Analytics in the Cloud, Jun. 23, 2013, pp. 36-40.

Popa, et al., "CryptDB: Processing Queries on an Encrypted Database", In Journal of Communications of the ACM, vol. 55, Issue 9, Sep. 2012, 13 pages.

U.S. Appl. No. 14/669,848, Antonopoulos, et al., "Extending the Database Server to Analyze Queries on Encrypted Data", filed Mar. 26, 2015.

U.S. Appl. No. 14/633,596, Vaswani, et al., "An Analysis for Recommending Encryption of Data without Effecting Program Semantics", filed Feb. 27, 2015.

* cited by examiner

DATABASE QUERY PROCESSING ON ENCRYPTED DATA

BACKGROUND

Data may be stored locally or remotely according to a variety of storage configurations and implementations. For instance, cloud computing is a recent development related to the deployment of remote servers and software networks that provides for centralized data storage and online access to resources and services, referred to as "cloud services." A set of cloud servers may host resources/services for a single user (a "tenant"), or for multiple related or unrelated users (a "multi-tenant" system). Similarly, data may be stored "on-site" by an entity, and may be accessed by that entity in that on-site data storage.

Data breaches are arguably the main deterrent for the adoption of cloud services for applications that manage sensitive, business critical information. On a public cloud, applications must guard against potentially malicious cloud administrators, malicious co-tenants, and other entities that can obtain access to data through various legal means. Since the compute and storage platform itself cannot be trusted, any data that appears in cleartext (data that is not encrypted) anywhere on the cloud platform (on disk, in memory, over the wire, etc.) has to be considered susceptible to leakage or malicious corruption. In vertical industries such as finance, banking, and healthcare, compliance requirements mandate strong protection against these types of threats.

Accordingly, in some cases, a database server may store encrypted data, but have no access to the encryption keys for security reasons. This guarantees that any data stored in the database is encrypted until it passes to the client application (e.g., an intermediate application managed by the client entity), which runs in a protected environment. For example, the database server may use partially homomorphic encryption (PHE) schemes, secure hardware, and/or other secure forms of computation to process data in encrypted form, because the database server does not have access to the encryption keys. PHE schemes permit a restricted class of operations, but not all operations, to be performed directly on encrypted data without requiring encryption keys. Due to these security requirements and encrypted data computing constraints, handling queries on databases in a secure and efficient manner is difficult to implement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for secure handling of queries by a data server and a database application. A parameterized query is received from a client. The parameterized query is a parameterized version of a user query received by the client from a user application. Table column metadata is loaded for one or more table columns referenced by the parameterized query. The table column metadata indicates table column datatype information and an encryption scheme for each encrypted table column. Datatypes of expressions in the parameterized query are derived with any parameters and variables of the parameterized query indicated as having unknown datatypes. Any unsupported datatype conversions in the parameterized query are determined. An encryption scheme is inferred for any parameters and variables of the parameterized query to generate an inferred encryption scheme set. The datatypes of expressions in the parameterized query are re-derived with any parameters and variables of the parameterized query having their inferred encryption schemes. Encryption key metadata corresponding to the inferred encryption scheme set is loaded. An encryption configuration is transmitted to the client that includes the inferred encryption scheme for any parameters and variables.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
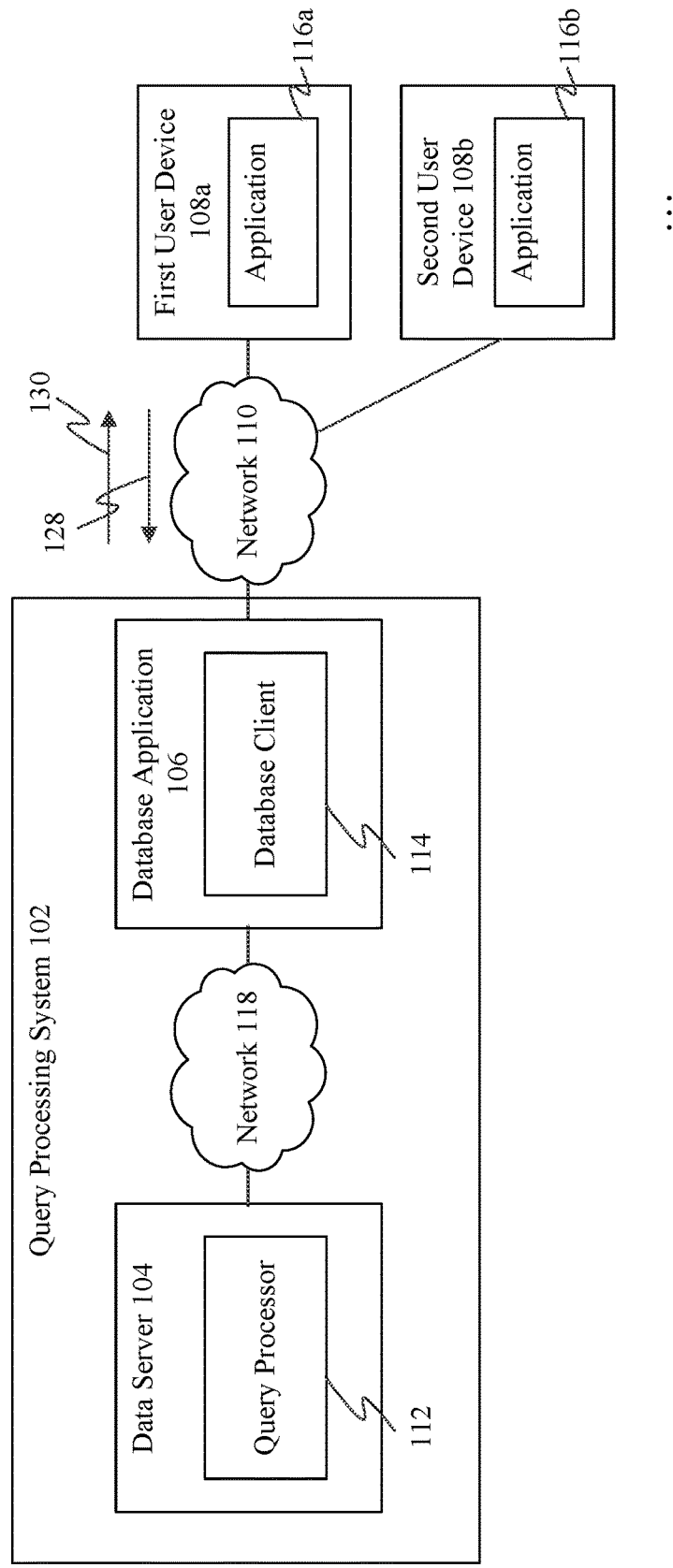
FIG. 1 shows a block diagram of communication system in which a query processing system processes user queries, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Secure and Efficient Processing of Queries

Embodiments described herein relate to the use of encryption to protect data hosted on untrusted platforms. While many conventional encryption schemes preserve data confidentiality, such encryption schemes typically do not permit an untrusted platform to run any computation on encrypted data. This significantly reduces the benefits of hosting applications on cloud platforms.

For example, a data server (e.g., a database server) may use partially homomorphic encryption (PHE) schemes, secure hardware, and/or other secure forms of computation to process some encrypted data, because the data server may not be considered "trusted," and thus does not have access to encryption keys used to encrypt the data. PHE schemes permit a restricted class of operations, but not all operations, to be performed directly on encrypted data without requiring encryption keys.

According to embodiments, when a user needs to query encrypted data stored at a data server, the user device ("requestor") sends the query to the data server through a database application (also referred to as "client"). Because the data server is not trusted with non-encrypted data, all parameters, predicates, etc. of the query have to be encrypted with the corresponding encryption keys. The query results that are returned to the requestor are also encrypted and have to be decrypted. Typically, the database application decrypts the data and provides the decrypted data to the requestor. Data included in the query itself (e.g., parameter values) may have to be encrypted before providing to the data server, to avoid unwanted exploitation of the query data at the data server. Accordingly, in an embodiment, the query may be transformed into a secure form for providing to the data server.

Accordingly, in an embodiment, the database application is configured to transform the query and encrypt the query parameters before sending the query to the data server. The database application may also be configured to acquire the encryption keys used for the data encryption/decryption from another source.

For example, a database may include a "patients table" that stores patient information, including First Name, Last Name and Social Security Number, for each patient in corresponding columns, and each column may be encrypted. A data server may service queries put to the database, which are initially received by a database application and provided to the data server. For instance, a user may submit the following query on the patients table:

SELECT FirstName, LastName FROM Patients WHERE SSN='1234567'

This particular query requests values for First Name and Last Name from the respective columns of the table for a social security number (SSN) having a value of 1234567.

Since the SSN column of the table is encrypted, the database application has to encrypt the SSN parameter value '1234567', which appears in the predicate of the query, with the appropriate encryption algorithm and key so that the data server can evaluate the predicate on the encrypted data. Because the FirstName and LastName columns are encrypted, encrypted data values are returned by the data server for the query. When the query results are returned to the database application, the database application has to determine the encryption scheme for the FirstName and LastName columns so that the values in each row can be decrypted. This analysis can become much more complicated for complex queries with intermediate variables, temporary tables, etc.

Others have tried to solve this problem by adding logic to analyze the query on the database client. Accordingly, the database client has to have encryption metadata and a query compiler to analyze the query and determine what needs to be encrypted for sending to the data server and how the results can be decrypted. Such solutions do not use the data server as a centralized location for storing the encryption keys, but expect each database client to acquire the encryption keys by some other means. Such solutions have the disadvantage that the database client has to be extended with significant query compilation capabilities, to manage encryption metadata, and to use resources to perform the query results processing. This provides difficulties for entities that want to enable queries to data stored at a data server, because the entities have to deploy and manage more complex database clients and provision the appropriate encryption keys.

According to embodiments, a data server is extended to store encryption metadata and to analyze user queries to decide whether they can be executed on encrypted data. If the determination is that a query can be executed on encrypted data, the data server determines how the query is to be transformed so that the query can be executed, and how each parameter is to be encrypted. When the data server returns the query results to the database application, the data server describes how the query results data is encrypted so that the results can be decrypted by the database application Furthermore, in an embodiment, the encryption keys may be stored at the data server, encrypted using a master encryption key that is known or available to the database application. In this manner, the database application can request the data encryption key(s) from a centralized location (the data server), decrypt the data encryption key(s) using the master key, and use the decrypted keys as desired.

When a user submits a query, the user can submit the query as if the query is to be executed on unencrypted data. The database application sends a parameterized form of the query to the data server to be analyzed using the encryption metadata. The data server replies to the database application indicating how to transform the query, and indicating what query parameters are to be encrypted and with what encryption scheme and key. If the database application does not have the appropriate encryption key(s), the database application can requests the key(s) from the data server (or other location) and decrypt the key(s) using the master key.

The database application sends the transformed query to the data server, and receives the encrypted query results from the data server with the description of how the query results are to be decrypted. The database application decrypts the results and returns them to the user.

In an embodiment, with respect to the example described above regarding a patients table, when the database application receives a query with unencrypted values/parameters in the predicate, the database application submits a request to the data server to analyze a parameterized query. An example parameterized query version of the above query is "SELECT FirstName, LastName FROM Patients WHERE SSN=@p1", where the predicate is filled with parameterized data ("@p1") rather than the actual predicate data received from the user ("1234567"). The data server is configured to analyze the parameterized query, taking into account the column encryption metadata. The data server verifies whether the equality predicate can be evaluated for the SSN column. If not, the data server fails the query. Otherwise, the data server generates an encryption configuration based on the parameterized query that describes the encryption algorithm and key that should be used to encrypt the SSN parameter data for sending to the data server.

Once the database application receives the encryption configuration from the data server, the database application encrypts the SSN parameter value with the appropriate encryption scheme and executes the query on the data server. If the database application does not have the appropriate data encryption key, the database application can request the encryption key from the data server (or other source) and decrypt the data encryption key using the master key, which is available to the database application but not the data server. Once the query, with encrypted parameters, is submitted to the data server, the data server executes the query on the encrypted data. The generated results set includes the query results, as well as an indication of the encryption scheme(s) of the results set. In this example, the FirstName and LastName columns are encrypted. Therefore, the data server provides the encryption scheme for both of the returned FirstName and LastName columns to the database application with the query results. Using this information, the database application decrypts the results values in each row and return the results to the user.

In embodiments, the data server has query compilation and metadata management capabilities, and these can be extended to perform the above described functions. Therefore, building the described functionality on the data server side enables simplified implementation.

Embodiments also enable database applications to be kept relatively thin (non-complex), and database application resources to be not used. The database applications can be upgraded as desired without new database applications having to be deployed.

Furthermore, the data server may be used as a centralized location for the data encryption keys, thereby simplifying data encryption key management for entities.

Accordingly, in embodiments, database metadata at a data server tracks which columns in a table are encrypted, how the columns are encrypted, and encrypted versions of the encryption key(s) are maintained. A protocol for a database application library is provided for interactions with the data server, to identify which input parameters in a query or stored procedure have to be encrypted and how. The protocol may also indicate any other transformation of the query that the server desires. The protocol indicates how the database application receives encryption information for data retrieved from the server. A protocol is also provided for receiving encryption keys (in encrypted form) from the data server. Still further, an analysis is enabled in the server for determining whether a query can be answered based on encrypted data.

Embodiments may be implemented in various environments. For instance, FIG. 1 shows a block diagram of communication system in which a query processing system processes user queries, according to an example embodiment. As shown in FIG. 1, communication system 100 includes a database application system 102, a first user device 108a, and a second user device 108b, which are coupled together by a first network 110. Database application system 102 is configured to process user queries received from user devices 108a and 108b in a secure and efficient manner. Database application system 102 may be implemented in the form of one or more computing devices. Database application system 102 includes a data server 104 and a database application 106, which are coupled together by a second network 118. Data server 104 includes a query processor 112, and database application 106 includes a database client 114. First user device 108a includes an application 116a, and second user device 108b includes an application 116b. System 100 is further described as follows.

First and second user devices 108a and 108b may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a Blackberry® device, etc.), a wearable computing device (e.g., a smart watch, a head-mounted device including smart glasses such as Google® Glass™ etc.), a personal navigation assistant, a camera, or other type of mobile device (e.g., an automobile), or a stationary computing device such as a desktop computer or PC (personal computer). Although a pair of user devices are shown in FIG. 1, in other embodiments, other numbers of user devices may be present in system 100, including one or other numbers in the single digits, numbers in the tens, hundreds, thousands, or even greater numbers of user devices.

Data server 104 and database application 106 each may be implemented as or in one or more computing devices configured as server devices. In one embodiment, data server 104 and database application 106 are included in different sets of one or more computing devices, and in another embodiment, data server 104 and database application 106 are included in a common set of one or more computing devices. Database application 106 may be considered a client or middle tier application, and data server 104 may be considered a database server for the client. In embodiments, data server 104 may serve any number of database applications 106.

Each of data server 104, database application 106, first user device 108a, and second user device 108b may include at least one network interface that enables communications over one or both of networks 110 and 118. Such network interface(s) may include one or more of any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of networks 110 and 118 include a local area network (LAN), a wide area network (WAN), a personal area network (PAN), and/or a combination of communication networks, such as the Internet. When data server 104 and database application 106 are included in a same computing device, network 118 may not be present.

In an embodiment, one of first and second user devices 108a and 108b (requestors) may issue a query to database application system 102. The query may be caused to be issued by a person/user/customer interacting with an application executing on the user device, or automatically by an application executing on the user device. For instance, applications 116a and 116b at user devices 108a and 108b, respectively, may be interacted with by a user to cause a query to be submitted and/or may automatically cause a query to be submitted. Thus, applications 116a and 116b and/or user devices 108a and 108b may be considered to be requestors. Examples of applications 116a and 116b include browsers (e.g., that navigate to a website provided by database application 106), mobile or desktop apps, database-accessing applications, and any other type of applications capable of submitting queries to a query processing system.

In FIG. 1, an example query 128 is submitted by application 116a at first user device 108a to database application system 102. Query 128 may include an SQL (structured query language) query, or other type of query of a database managed by data server 104. Query 128 is transmitted over network 110 to be received by database application 106 of database application system 102. Database application 106 is considered a trusted entity with respect to the query. For example, in one embodiment, database application 106 may be managed by a bank (or other service provider), and may provide a front end for receiving queries from customers of the bank (or other service provider). Thus, query 128 may include data considered sensitive by the user/requester, and/or may be configured to access data at data server 104 that is considered sensitive. Such data may be represented in cleartext (unencrypted) at database application 106. For instance, query 128 may be a request by a bank's customer to access his/her account data. Query 128 may include identifying information for the customer, such as their banking account number (in a banking context), their social security number, etc. Database client 114 processes query 128, and handles interactions with query processor 112 at data server 104 to have query 128 processed. For example, database client 114 may comprise an ADO.NET client library published by Microsoft Corporation, or other instance of a database interface at database application 106. Data server 104 is not considered to be a trusted entity with respect to query 128. For example, in one embodiment, data server 104 may be managed by a cloud-based storage provider unaffiliated with the owner of database application 106, or by other entity that stores data of users/customers of database application 106, but is not trusted with the data. As such, at least some data stored at data server 104 is encrypted so that the data may not be compromised at data server 104. In one example, data server 104 may comprise an instance of SQL SERVER®, published by Microsoft of Redmond, Wash., or may include an instance of an alternative database server mechanism (e.g., Oracle® Database published by Oracle Corporation of Redwood City, Calif., etc.).

Accordingly, in an embodiment, database client 114 may transmit a parameterized version of query 128 to query processor 112 (through network 118, when present). The parameterized version of query 128 does not include sensitive information, but instead may include dummy values or other indicators of parameterized data, which therefore does not expose some or all of the actual data associated with query 128. For instance, query 128 may include a social security number (SSN) of a person. In this example, database client 114 processes query 128 to generate the parameterized query to include @p1 rather than the actual SSN, thereby protecting the SSN from being exposed at data server 104.

Query processor 112 analyzes the parameterized query to determine whether the query 128 can be processed at data server 104 with its contents being encrypted. In other words, in the current example, query processor 112 determines whether query 128 can be processed at data server 104 if the value of the contained SSN is encrypted, rather than the actual SSN being provided to data server 104. If query processor 112 determines from analysis of the parameterized query that query 128 cannot be processed at data server 104 based on encrypted data, query processor 112 transmits a query response to database client 114 (through network 118, when present) indicating that query 128 cannot be processed. If query processor 112 determines from analysis of the parameterized query that query 128 can be processed at data server 104 based on encrypted data, query processor 112 generates an encryption configuration for query 128 that indicates which data of query 128 (e.g., parameter values, predicates, etc.) is to be encrypted, and how the data is to be encrypted, when query 128 is presented to data server 104. Query processor 112 transmits a query response to database client 114 (through network 118, when present) providing the encryption configuration for query 128.

If query processor 112 indicated the failure in the query response, database client 114 may transmit query results 130 from database application 106 to first user device 108a, through network 110, indicating the failure to application 116a. The failure may be presented to a user of first user device 108a.

Alternatively, if query processor 112 provided the encryption configuration in the query response, database client 114 may generate and provide a transformed version of query 128 to query processor 112 (through network 118, when present) that includes contents encrypted according to the received encryption configuration. For instance, continuing the current example, the SSN value of "1234567" may be encrypted according to a particular encryption technique indicated in the encryption configuration, and provide in this encrypted form in the transformed version of query 128. As described herein, further transformations may be made to query 128 in the transformed version.

Database client 114 transmits the transformed version of query 128 to query processor 112 (through network 118, when present). Database client 114 processes the query to generate query results, which are transmitted to database client 114 (through network 118, when present). The query results may include encrypted information, extracted from encrypted columns of a database at data server 104 and/or generated by operations (e.g., addition, subtraction, division, multiplication, etc.) performed by query processor 112 on encrypted data. Database client 114 may decrypt the encrypted data, and transmit the decrypted form of the query results to application 116a at first user device 108a through network 110.

Note that in an embodiment, if database client 114 does not have access to data encryption keys for encrypting data (of the transformed version of query 128) or decrypting data (of the query results), database client 114 may request the encryption keys from data server 104. Data server 104 may store the encryption keys, but in an encrypted form so that the encryption keys may not be used at data server 104 to compromise data of the transformed version of query 128 and/or database data. It is noted that in system 100, the encrypted data stored in columns at data server 104, as well as the encryption/decryption keys, never appear in cleartext on data server 104. Data server 104 may transmit the encrypted encryption keys to database client 114 on request, or automatically (e.g., with the query results). Database client 114 may decrypt the encrypted encryption/decryption keys using a master encryption key maintained at database application 106, and use the encryption keys to encrypt data (e.g., in the transformed version of query 128) and/or decrypt data (e.g., in the query results) as needed. Database client 114 may include the decrypted query results in query results 130, and transmit query results 130 from database application 106 to first user device 108a, through network 110. The query results may be presented to a user of first user device 108a.

Accordingly, database application system 102 enables the secure and efficient handling of queries. Data can be maintained at data server 104 in an encrypted form. Parameterized forms of received queries can be generated by database client 114 (at database application 106) for completion analysis by query processor 112, thereby avoiding exposing actual data of the queries at data server 104. The analysis indicates whether the queries can be processed on encrypted data by query processor 112. If the queries cannot be processed, query processor 112 indicates a failure to database client 114. If the query can be processed, query processor 112 indicates to database client 114 how to transform the query to protect included data, and the transformed query is processed by query processor 112 to generate query results. The query results are decrypted by database client 114 and provided to the requestor. In this manner, no data is exposed at data server 104 in an unencrypted form (unless exposure of particular data is permissible), providing a high level of data security.

In embodiments, database application system 102 of FIG. 1 may be configured in various ways, and may operate in various ways, to enable secure query processing. The next section (Section II.A) provides example embodiments for handling received queries at the database application side, followed by a section (Section II.B) providing example embodiments for processing queries at the database server side, which is followed by a section (Section II.C) providing further example embodiments for processing queries at the database server side. These sections are followed by a section (Section III) describing exemplary computing device embodiments, and a section (section IV) providing additional embodiments.

A. Example Database Application Side Embodiments for Handling Queries

Figure 2:
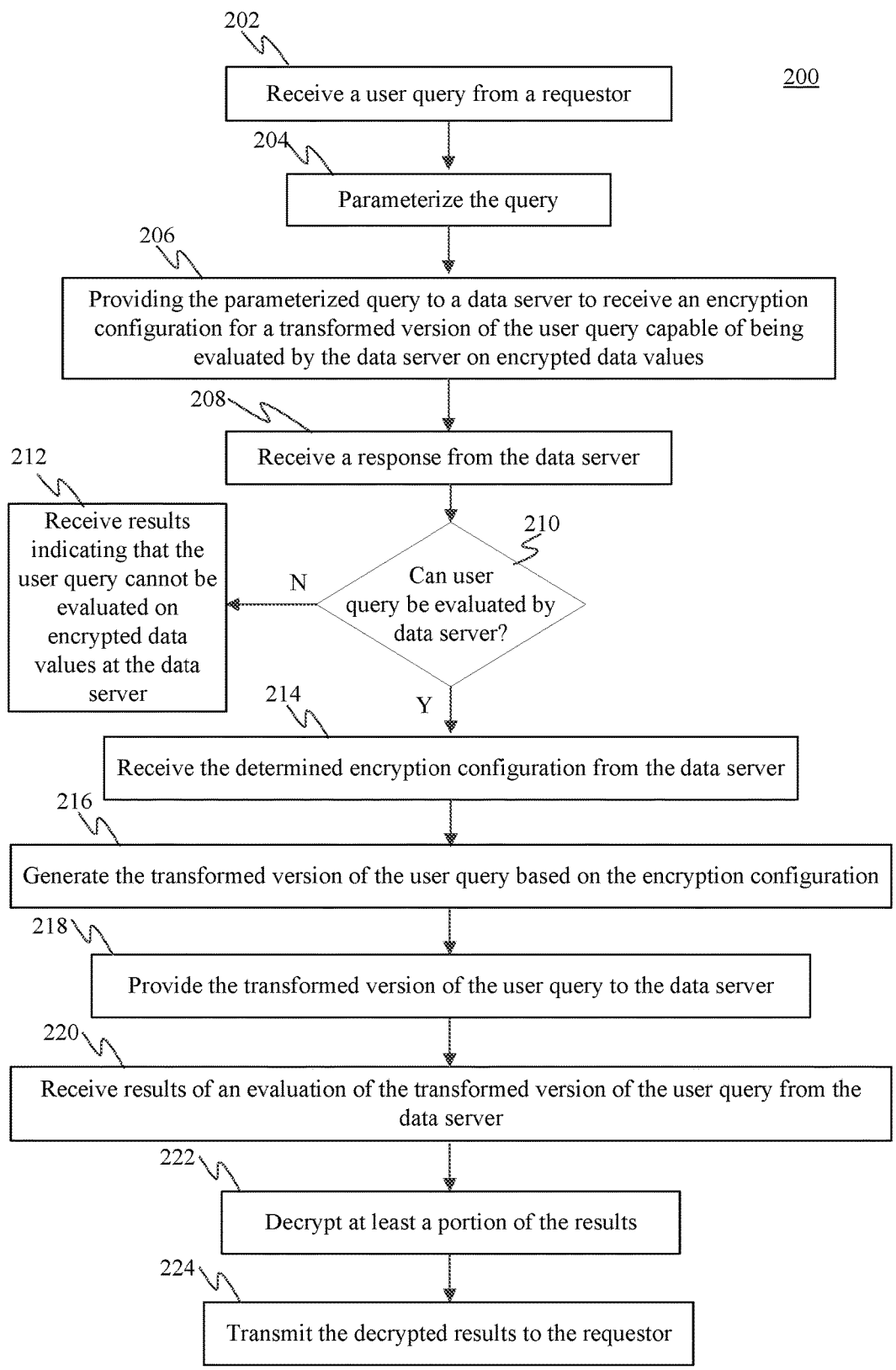
FIG. 2 shows a flowchart providing a process in a database application for handling user queries in a manner that maintains data security, according to an example embodiment.
Figure 3:
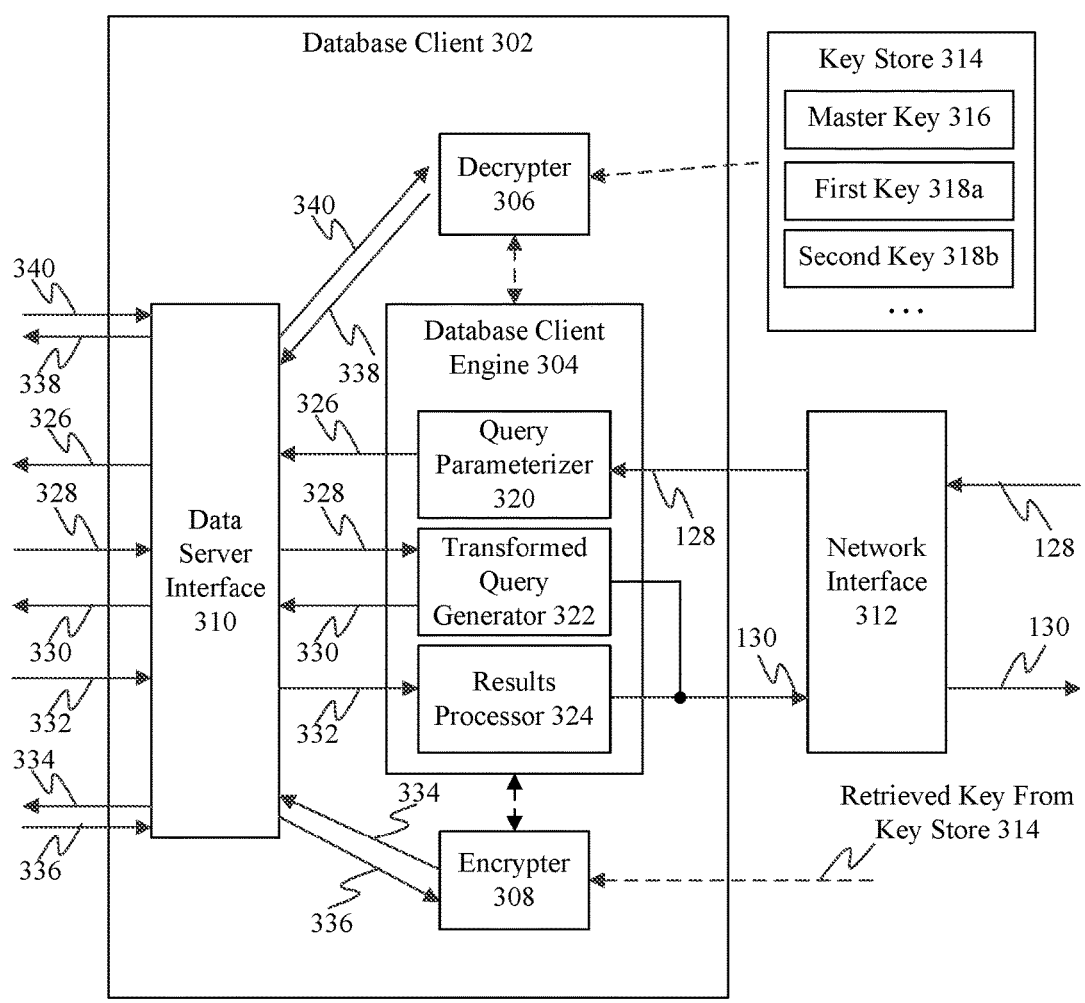
FIG. 3 shows a block diagram of a database application containing a database client configured to generate a parameterized query based on a user query, to generate a transformed version of the user query based on a configuration encryption provided by the data server, and to provide the transformed version to the data server for execution, according to an example embodiment.

In embodiments, database application 106 and database client 114 may be configured in various ways to handle received queries. For instance, FIG. 2 shows a flowchart 200 providing a process in a database application for processing user queries to maintain data security, according to an example embodiment. Database client 114 may operate according to flowchart 200 in embodiments. For illustrative purposes, flowchart 200 is described below with respect to FIG. 3. FIG. 3 shows a block diagram of a database application 300 that contains a database client 302 configured to communicate with a query processor to handle user queries in a secure manner, according to an example embodiment. Database application 300 is an example of database application 106, and database client 302 is an example of database client 114 of FIG. 1. As shown in FIG. 3, database application 300 includes database client 302, a network interface 312, and a key store 314. Database client 302 includes a database client engine 304, a decrypter 306, an encrypter 308, and a data server interface 310. Database client engine 304 includes a query parameterizer 320, a transformed query generator 322, and a results processor 324. Database application 300, database client 302, and flowchart 200 are described as follows. It is noted that the steps of flowchart 200 do not necessarily have to occur in the order shown in FIG. 2, but may occur in other orders.

Flowchart 200 of FIG. 2 begins with step 202. In step 202, a user query is received from a requestor. For example, with reference to FIG. 3, network interface 312 of database application 300 may receive query 128 (e.g., from first user device 108a in FIG. 1), and may forward query 128 to be received by query parameterizer 320 of database client engine 304. Network interface 312 is a communication interface with a network (e.g., network 110 of FIG. 1), and further examples and description of network interfaces are provided elsewhere herein.

Query 128 is a query that a requester desires to be executed against data (e.g., in a database) managed by a data server (e.g., data server 104 of FIG. 1). Query 128 may include one or more operations on one or more variables and/or query parameter values that are accessed in data at the data server. Such operations may be defined to be performed on column data, performed in a predicate of the query (specifying a condition to be evaluated), etc.

For instance, in an SQL (structured query language) query, a declarative "Select" statement may be used to signify a query. Query 128 may list after the "Select" statement one or more database table columns to appear in the query results. Operations may be indicated to be performed on the columns (e.g., "column_1+column_2", etc.). A "From" clause may indicate one or more tables from which data is to be retrieved. A "Where" clause includes a comparison predicate, which restricts rows returned by the query. Many other types of types of clauses may be present in query 128, as would be known to persons skilled in the relevant arts.

For example, an example SSN (social security number)-based query is shown below:

SELECT FirstName, LastName, Base_Salary+Annual_Bonus FROM Employees WHERE SSN=12345678

According to this example, the query results will include data from the "FirstName" and "LastName" columns, and a sum of the "Base_Salary" and "Annual_Bonus" columns (row-by-row addition operations are performed on the "Base_Salary" and "Annual_Bonus" columns to generate the sum results). The "From" clause indicates that the indicated columns are selected from the "Employees" table stored in a database managed by the data server. The "Where" clause provides a restriction, indicating that data from the indicated columns of the indicated table is selected from one or more rows having a value in the "SSN" column equal to "12345678."

In flowchart 200, operation proceeds from step 202 to step 204.

In step 204, the query is parameterized. In an embodiment, query parameterizer 320 is configured to parameterize received user query 128. For example, in an embodiment, query parameterizer 320 may be configured to parse query 128 for parameter values (actual data), and for each found parameter value, to insert a dummy value, essentially changing the parameter value from a data value that may be sensitive to some other non-sensitive value. For instance, with reference to the above SSN-based query example, query parameterizer 320 may generate a corresponding parameterized query. Query parameterizer 320 may find the parameter value of "12345678" in query 128, and in the parameterized query, may change that parameter value to a dummy value, such as "@p1." The dummy value of @p1 is in no way relatable by the data server to the original parameter value of "12345678."

As shown in FIG. 3, query parameterizer 320 generates a parameterized query 326. Operation proceeds from step 204 to step 206.

In step 206, the parameterized query is provided to a data server to receive an encryption configuration for a transformed version of the user query capable of being evaluated by the data server on encrypted data values. For example, as shown in FIG. 3, data server interface 310 may receive parameterized query 326. Data server interface 310 is configured as a communication interface for communications with one or more data servers (and optionally with other entities). In some embodiments, data server interface 310 may not need to be present. Data server interface 310 is configured to provide (e.g., transmit) parameterized query 326 to a data server (e.g., over network 118 of FIG. 1).

In an embodiment, the data server is configured to analyze parameterized query 326 to determine whether query 128 contains data that is encrypted at the data server, and if so, to determine whether query 128 can be evaluated at the data server on the encrypted data (e.g., if one or more of the parameter values of query 128 are encrypted, such as the SSN value of "12345678" in the example above). Operation proceeds from step 206 to step 208.

In step 208, a response is received from the data server. For example, as shown in FIG. 3, data server interface 310 may receive a query analysis response 328, and may forward query analysis response 328 to transformed query generator 322 of database client engine 304. Operation proceeds from step 208 to step 210.

In step 210, it is determined whether the user query can be evaluated by the data server. In an embodiment, transformed query generator 322 evaluates query analysis response 328 to determine whether the data server indicated a failure (the data server cannot evaluate query 128 on encrypted data) or a success (the data server can evaluate query 128 on encrypted data). If query analysis response 328 indicates a failure, operation proceeds from step 210 to step 212. If query analysis response 328 indicates a success, operation proceeds from step 210 to step 214.

In step 212, results are received that indicate the user query cannot be evaluated on encrypted data values at the data server. Accordingly, in step 212, a failure is indicated in query analysis response 328, and thus the data server cannot evaluate query 128 on encrypted data values. As such, an indication of the failure to process query 128 may be provided by transformed query generator 322 in query results 130, which may be transmitted to the requester by network interface 312. Alternatively, another process may be implemented to evaluate query 128 in another way. Operation of flowchart 200 ends after step 212.

In step 214, the determined encryption configuration is received from the data server. In an embodiment, if transformed query generator 322 finds an encryption configuration provided by the data server in query analysis response 328, this indicates that the data server has determined it can evaluate query 128 on encrypted data, and has provided information (e.g., instructions) for formatting/transforming query 128 into a secure form for providing to the data server for evaluation. Operation proceeds from step 214 to step 216.

In step 216, the transformed version of the user query is generated based on the encryption configuration. In an embodiment, transformed query generator 322 uses the encryption configuration received in query analysis response 328 as instructions for generating a transformed version of query 128 that includes encrypted data. Transformed query generator 322 generates the transformed query based on the encryption configuration.

For example, the encryption configuration may indicate which parameters of query 128 (e.g., by parameter identifier, by position in query 128, etc.) are to be encrypted in the transformed version, one or more encryption schemes for encrypting the parameters, and one or more data encryption keys (e.g., by key identifier, etc.) to be used by the one or more encryption schemes for encrypting the parameters. For a particular query, any number of parameters may be listed in encryption configuration with corresponding encryption schemes and keys. Accordingly, transformed query generator 322 may be configured to request encrypter 308 to encrypt one or more parameter values according to specified encryption schemes and keys. In embodiments, encrypter 308 may be configured to implement one or more types of encryption schemes to encrypt plaintext data into ciphertext, as would be known by persons skilled in the relevant arts. Such encryption schemes may include public and/or private key encryption schemes, homomorphic encryption schemes (allows computations/operations to be performed on ciphertext), partially homomorphic encryption schemes (allows a particular set of computations/operations to be performed on ciphertext), deterministic encryption schemes (always produces the same ciphertext for a same plaintext and key), probabilistic encryption schemes (particular plaintext can encrypt to any one of a set of possible ciphertexts, chosen randomly during the encryption process), and/or other type of encryption scheme(s).

For instance, with respect to the example SSN-based query, the encryption configuration may indicate the following:
for parameter value @p1
use encryption scheme X
use encryption key Y Accordingly, transformed query generator 322 is configured to generate a transformed version of the SSN-based query that includes the parameter value "12345678" encrypted according to encryption scheme X using encryption key Y. Using encryption scheme X with encryption key Y, the parameter value "12345678" may be encrypted by encrypter 308 to generate the encrypted value of "!@#&HF%%". In such an example, the SSN-based query may be expressed with encrypted values as
SELECT FirstName, LastName, Base_Salary+ Annual_Bonus FROM Employees WHERE SSN=!@#&HF%%

As described further below, the encryption configuration may also provide instructions for transformed query generator 322 to make other transformations to query 128, including changing data type for parameters, changing operations, and/or other transformations.

As shown in FIG. 3, key store 314 includes a master key 316, a first key 318a, a second key 318b, and any additional number of encryption keys. In some cases, an encryption key indicated in encryption configuration received in query analysis response 328 may be present in key store 314. Thus, encrypter 308 may access the encryption key in key store 314, and use the encryption key to encrypt one or more parameters as directed by the encryption configuration. Alternatively, query analysis response 328 may include one or more encryption keys indicated in the encryption configuration. Thus, encrypter 308 may use the encryption key(s) received with the encryption information to encrypt one or more parameters as directed.

In still another embodiment, encrypter 308 may not have access to an encryption key at database application 300 that was indicated in the encryption configuration. Accordingly, encrypter 308 may be configured to request the encryption key from another source, such as the data server. In an embodiment, a data server may store one or more encryption keys, in encrypted form, that can be provided to encrypter 308 at database application 300.

Figure 4:
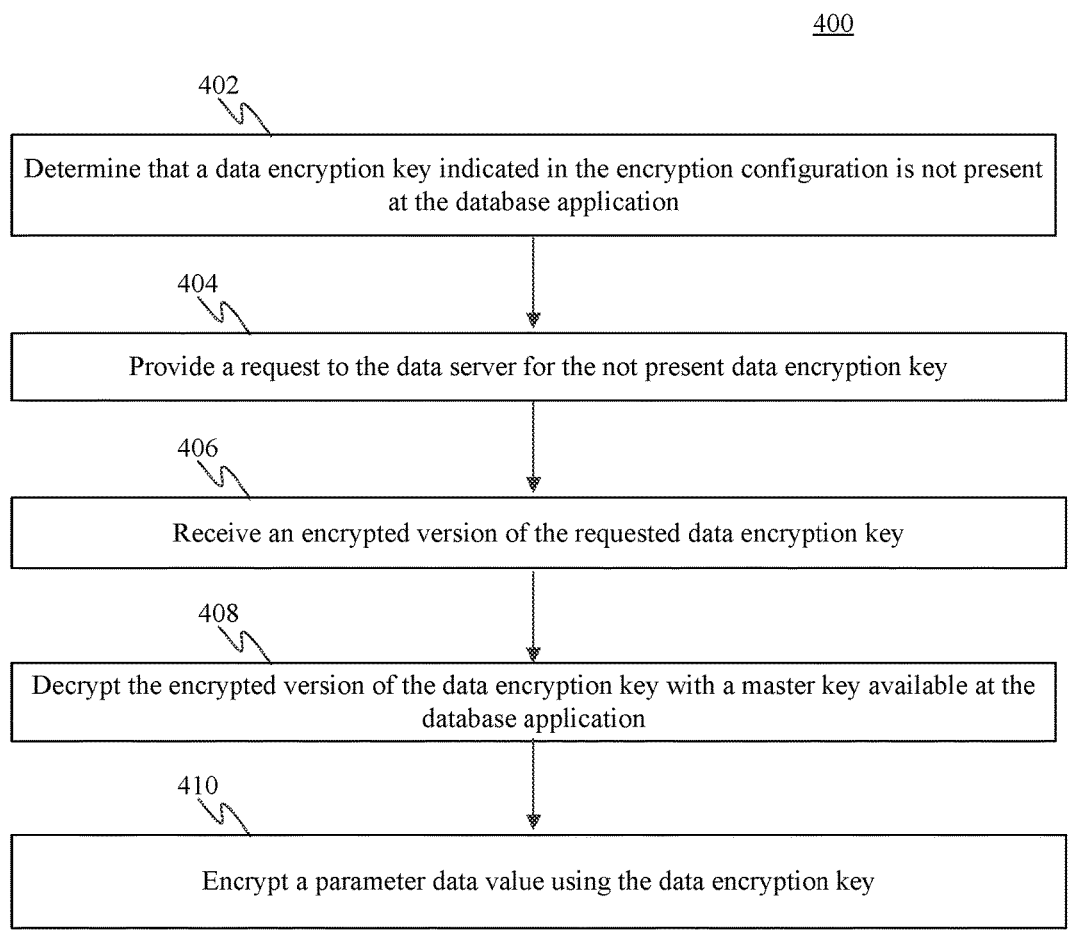
FIG. 4 shows a flowchart providing a process in a database application for retrieving a data encryption key from a data server for encrypting query data, according to an example embodiment.

For instance, in an embodiment, encrypter 308 may operate according to FIG. 4. FIG. 4 shows a flowchart 400 providing a process for retrieving a data encryption key from a data server for encrypting query data in a transformed version of a user query, according to an example embodiment. Flowchart 400 is described as follows.

Flowchart 400 begins with step 402. In step 402, a data encryption key indicated in the encryption configuration is determined to not be present at the database application. In an embodiment, as described above, transformed query generator 322 may access encrypter 308 to encrypt a parameter value according to a specified encryption scheme and key. Encrypter 308 may determine that the encryption key is not available, such as by a failure to retrieve the encryption key from key store 314 or other location, by the encryption key not being provided with the encryption configuration, etc.

In step 404, a request is provided to the data server for the not present data encryption key. In an embodiment, encrypter 308 may generate a key request 334 that is provided by data server interface 310 to the data server. Key request 334 is a request for the encryption key that was unable to be retrieved at database application 300.

In step 406, an encrypted version of the requested data encryption key is received. In an embodiment, as shown in FIG. 3, data server interface 310 may receive an encryption key 336, in encrypted form, from the data server in response to key request 334, and may provide the encrypted version of encryption key 336 to encrypter 308.

In step 408, the encrypted version of the data encryption key is decrypted with a master key available at the database application. In an embodiment, encrypter 308 may access master key 316 in key store 314, and use master key 316 use decrypt the received encrypted version of encryption key 336. Furthermore, encrypter 308 may optionally store the decrypted (or encrypted) version of encryption key 336 in key store 314 for subsequent use.

In step 410, a parameter data value is encrypted using the data encryption key. In an embodiment, encrypter 308 may use the decrypted version of encryption key 336 to encrypt the parameter value according to the specified encryption scheme. Encrypter 308 may provide the encrypted parameter value to transformed query generator 322.

As such, transformed query generator 322 generates the transformed version of query 128 according to the encryption configuration that was received in query analysis response 328. As shown in FIG. 3, transformed query generator 322 generates transformed version 330. Transformed version 330 is the transformed version of query 128, and includes any encrypted parameter values of query 128, rather than the unencrypted values, as well as the rest of the elements of query 128 (e.g., any operations, predicates, clauses, variables, etc.) in any suitable format. Furthermore, as described in further detail below in Section II.B, transformed version 330 may include one or more transformed data types for parameters, one or more transformed operations, and/or other transformations performed by transformed query generator 322 according to the encryption configuration. Operation proceeds from step 216 to step 218.

In step 218, the transformed version of the user query is provided to the data server. As shown in FIG. 3, transformed version 330 is received and forwarded by data server interface 310 to the data server (e.g., over network 118 of FIG. 1). Operation proceeds from step 218 to step 220.

In step 220, results of an evaluation of the transformed version of the user query are received from the data server. For instance, as shown in FIG. 3, evaluated query results 332 are received from the data server and forwarded by data server interface 310 to results processor 324 of database client engine 304. Evaluated query results 332 include the results of a query processor at the data server (e.g., query 112 at data server 104 in FIG. 1) processing transformed version 330. Accordingly, evaluated query results 332 may include one or more row/column values retrieved from one or more specified tables, one or more values that are determined by one or more operations performed on retrieved data, etc. Evaluated query results 332 may include encrypted results (e.g., encrypted columns, etc.) where encrypted data is retrieved from tables and/or is generated from operations performed on encrypted values. Operation proceeds from step 220 to step 222.

In step 222, at least a portion of the results are decrypted. In an embodiment, results processor 324 may be configured to process the query results included in evaluated query results 332, such as formatting the returned data, etc. When encrypted data is included in evaluated query results 332, results processor 324 may request decrypter 306 to decrypt the encrypted data. In embodiments, decrypter 306 may be configured to implement one or more types of decryption schemes to decrypt ciphertext into plaintext, as would be known by persons skilled in the relevant arts. For instance, decrypter 306 may implement decryption schemes to decrypt data encrypted according to any of the encryption schemes mentioned elsewhere herein or otherwise known. Note that in an embodiment, decrypter 306 and encrypter 308 may be included in a same functional block.

For instance, with respect to the above example SSN-based query, evaluated query results 332 may indicate an decryption scheme and key for any encrypted data included therein, such as the following:

for encrypted FirstName data
use decryption scheme W
use decryption key Z

In this example, decrypter 306 may decrypt FirstName data (e.g., a column of data containing first names of patients) using decryption scheme W with decryption key Z (note that a same data encryption key value may be used for related encryption and decryption schemes, in some cases). In one example provided for purposes of illustration, using decryption scheme W with encryption key Z, the received encrypted value "(&*^87&DF" may be decrypted by decrypter 306 to generate the decrypted value of "Samuel."

In some cases, a decryption key indicated in evaluated query results 332 may be present in key store 314. Thus, decrypter 306 may access the decryption key in key store 314, and use the decryption key to decrypt one or more parameters as directed by evaluated query results 332. Alternatively evaluated query results 332 may include one or more decryption keys for decrypting the query results. Thus, decrypter 306 may use the decryption key(s) received with evaluated query results 332 to decrypt one or more data values as directed.

In still another embodiment, decrypter 306 may not have access to a decryption key at database application 300 that was indicated in evaluated query results 332 for encrypted data. Accordingly, decrypter 306 may be configured to request the decryption key from another source, such as the data server. In an embodiment, the data server may store one or more decryption keys, in encrypted form, that can be provided to decrypter 306 at database application 300.

Figure 5:
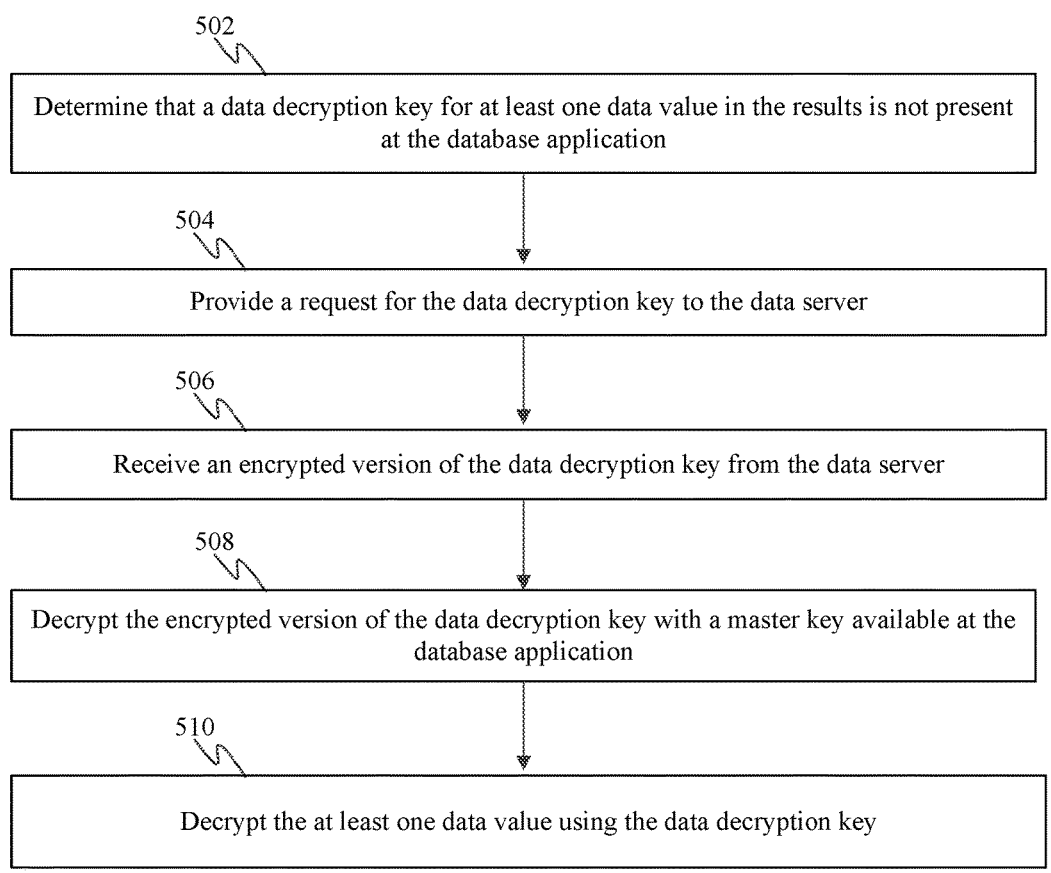
FIG. 5 shows a flowchart providing a process in a database application for retrieving a data encryption key from a data server for decrypting query results, according to an example embodiment.

For instance, in an embodiment, decrypter 306 may operate according to FIG. 5. FIG. 5 shows a flowchart 500 providing a process for retrieving a data encryption key from a data server for decrypting query results, according to an example embodiment. Flowchart 500 is described as follows.

Flowchart 500 begins with step 502. In step 502, a data decryption key for at least one data value in the results is determined to not be present at the database application. In an embodiment, as described above, results processor 324 may access decrypter 306 to decrypt encrypted data of evaluated query results 332 according to a specified decryption scheme and key. Decrypter 306 may determine that the decryption key is not available, such as by a failure to retrieve the decryption key from key store 314 or other location, by the decryption key not being provided in evaluated query results 332, etc.

In step 504, a request for the data decryption key is provided to the data server. In an embodiment, decrypter 306 may generate a key request 338 that is provided by data server interface 310 to the data server. Key request 338 is a request for the decryption key that was unable to be retrieved at database application 300.

In step 506, an encrypted version of the data decryption key is received from the data server. In an embodiment, as shown in FIG. 3, data server interface 310 may receive an encrypted version of a decryption key 340 from the data server in response to key request 338, and may provide the encrypted version of decryption key 340 to decrypter 306.

In step 508, the encrypted version of the data decryption key is decrypted with a master key available at the database application. In an embodiment, decrypter 306 may use decryption key 340 to decrypt the encrypted version of decryption key 340 according to the specified decryption scheme. Decrypter 306 may optionally store the decrypted (or encrypted) version of decryption key 340 in key store 314 for subsequent use.

In step 510, the at least one data value is decrypted using the data decryption key. In an embodiment, decrypter 306 may use the decrypted version of decryption key 340 to decrypt the data value according to the specified decryption scheme. Accordingly, decrypter 306 may provide the decrypted data to results processor 324.

As such, results processor 324 receives evaluated query results 332 from the data server. Results processor 324 may format the data of evaluated query results 332 as desired, and may use decrypter 306 to decrypt any encrypted data. As shown in FIG. 3, results processor 324 generates query results 130 to include the data received in evaluated query results 332, formatted and decrypted as desired. Operation proceeds from step 222 to step 224.

In step 224, the decrypted results are transmitted to the requestor. As shown in FIG. 3, network interface 312 receives query results 130 from results processor 324, and transmits query results 130 to the requester (e.g., over network 110, to application 116a at first user device 108a of FIG. 1). In this manner, user query 128 is handled in a secure and efficient manner, with any sensitive data being encrypted (ciphertext) at the data server (an untrusted entity), while being able to be in cleartext at database application 300 (a trusted entity). Operation of flowchart 200 may end after step 224.

B. Example Data Server Side Embodiments for Processing Queries

Figure 6:
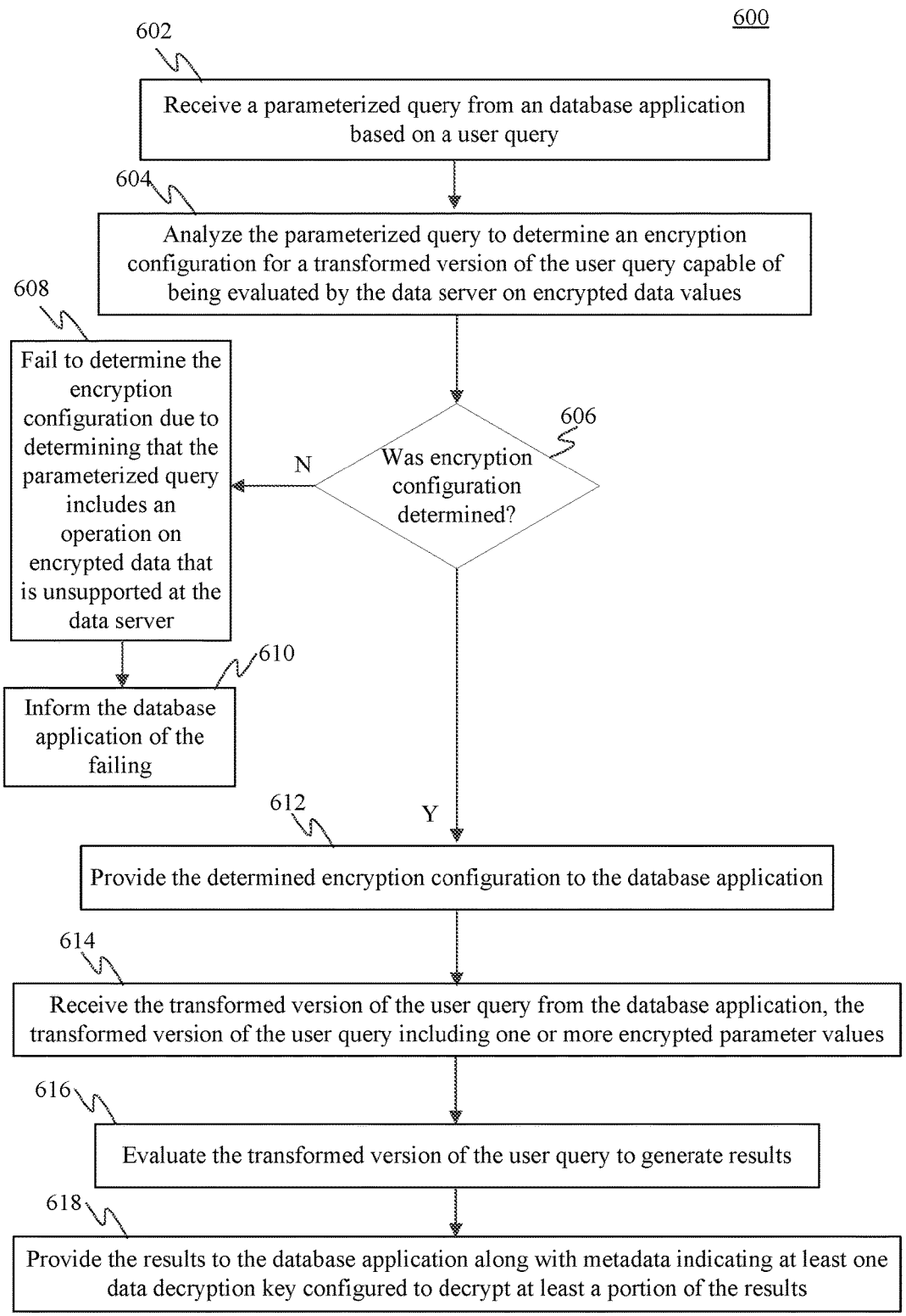
FIG. 6 shows a flowchart providing a process in a data server for processing user queries based on a transformed version of a user query in a manner that maintains data security, according to an example embodiment.
Figure 7:
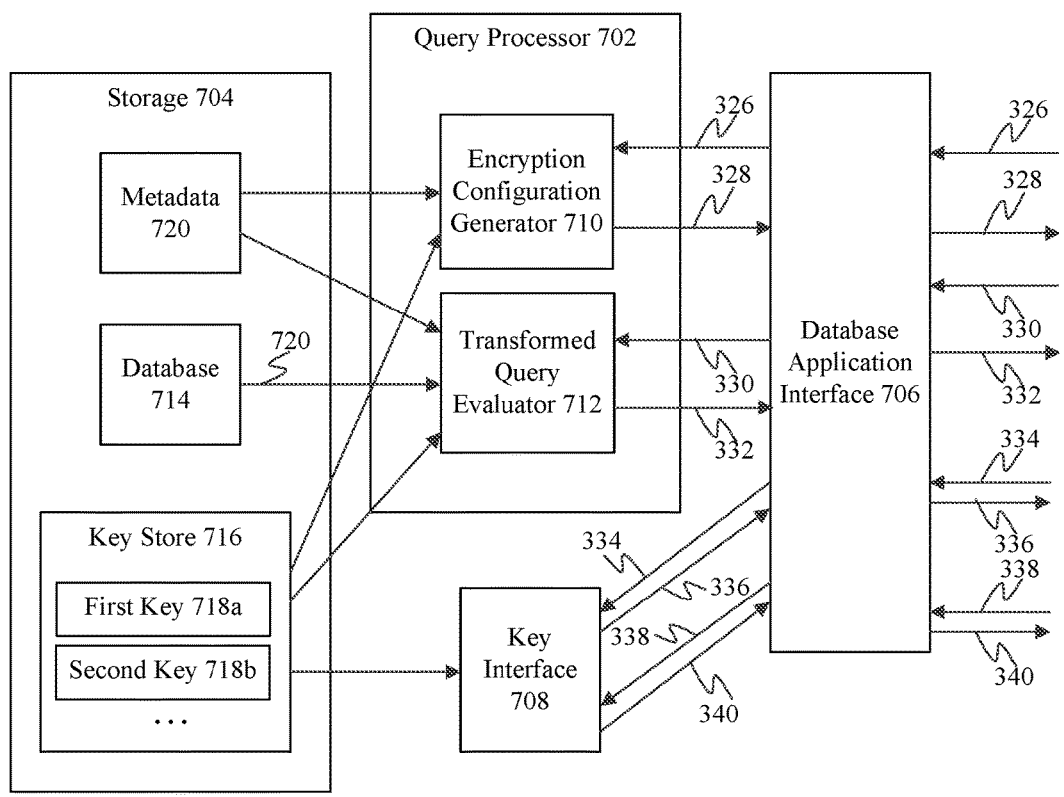
FIG. 7 shows a block diagram of a data server containing a query processor configured to generate an encryption configuration based on a parameterized user query, to provide the encryption configuration to the database application, and to execute a transformed version of the user query, according to an example embodiment.

In embodiments, data server 104 and query processor 112 may be configured in various ways to handle received queries. For instance, FIG. 6 shows a flowchart 600 providing a process in a data server for processing user queries in a manner that maintains data security, according to an example embodiment. Query processor 112 may operate according to flowchart 600 in embodiments. For illustrative purposes, flowchart 600 is described below with respect to FIG. 7. FIG. 7 shows a block diagram of a data server 700 that contains a query processor 702 configured to communicate with a database application to process user queries, according to an example embodiment. Data server 700 is an example of data server 104, and query processor 702 is an example of query processor 112 of FIG. 1. As shown in FIG. 7, data server 700 includes query processor 702, storage 704, a database application interface 706, and a key interface 708. Query processor 702 includes an encryption configuration generator 710 and a transformed query evaluator 712. Storage 704 stores a database 714, a key store 716, and metadata 720. Data server 700, query processor 702, and flowchart 600 are described as follows. It is noted that the steps of flowchart 600 do not necessarily have to occur in the order shown in FIG. 6, but may occur in other orders.

Flowchart 600 of FIG. 6 begins with step 602. In step 602, a parameterized query is received from a database application. For example, as shown in FIG. 7, database application interface 706 of data server 700 may receive parameterized query 326 (e.g., from database application 106 in FIG. 1, or database application 300 of FIG. 3), and may forward parameterized query 326 to be received by encryption configuration generator 710 of query processor 702. Database application interface 706 is configured as a communication interface for communications with one or more database applications (and optionally with other entities). In some embodiments, database application interface 706 may not need to be present.

As described above, parameterized query 326 is a modified version of query 128, which is directed at data stored in database 714 in any form. Parameterized query 326 includes dummy values in place of the actual parameter values of query 128, so that sensitive data is not provided to data server 700. Operation proceeds from step 602 to step 604.

In step 604, the parameterized query is analyzed to determine an encryption configuration for a transformed version of the user query capable of being evaluated by the data server on encrypted data values. In an embodiment, encryption configuration generator 710 is configured to analyze parameterized query 326 to determine whether an encryption configuration exists for query 128, such that query 128 can be evaluated by query processor 702 on encrypted data values (e.g., encrypted parameter values), rather than on cleartext data. If query 128 can be evaluated on encrypted data values, security of the data of query 128 can be preserved at data server 700.

Accordingly, in one embodiment, prior to generating an encryption configuration, encryption configuration generator 710 may analyze parameterized query 326 to determine whether an encryption configuration can be generated. This analysis may be performed in various ways. For example, in an embodiment, encryption configuration generator 710 may determine whether parameterized query 326 includes any operations on encrypted data that are unsupported at the data server. If so, query 128 cannot be evaluated by query processor 702 on encrypted data.

For instance, in an embodiment, parameterized query 326 may be converted by encryption configuration generator 710 in the form of an expression tree, or may be received from the database application already in this form. In an expression tree representation, each parameter value or other type of variable may be set as a "leaf" of the tree that branches inward, and the expressions/operations may be at intersections of the branches of the tree. Each expression of the tree receives one or more of a parameter value, a variable, and/or the solution of a prior evaluated expression as input values, and generates an expression solution as output. Thus, encryption configuration generator 710 may begin evaluation of the expression tree at the leaves, and may traverse inward to analyze the inputs of each expression/operation, until final result(s) is/are determined for the expression tree. If even one expression/operation receives an input value that is encrypted at data server 700, and it is known that the particular expression/operation cannot be evaluated on that particular type of encryption (or on encrypted data at all), the analysis fails in its entirety, and query 128 cannot be evaluated on encrypted data at data server 700. However, if all operations in the expression tree are determined to be able to be evaluated on their inputs, even when their inputs are encrypted, then query 128 can be evaluated on encrypted data at data server 700, and an encryption configuration can be generated.

In an embodiment, for each type of operation (e.g., addition, subtraction, multiplication, division, etc.) that may be received in query 128, a record is maintained of what types of encrypted inputs the operation can operate upon, if any. For instance, encryption configuration generator 710 may store a table or other data structure that indicates which operations can be performed on what types of encrypted data as inputs, if any, or may use another technique to maintain a record of which operations can be performed on what types of encrypted data. Such data structure may be stored in storage 704, or elsewhere.

Furthermore, metadata 720 may include metadata indicating which data in database 714 (e.g., which columns) is/are encrypted, what the particular encryption scheme is for each data (e.g., for each column), and what is the encryption key for each data. Encryption configuration generator 710 may use this metadata when analyzing the expression tree for parameterized query 326. For instance, when analyzing a particular operation on one or more encrypted columns in database 714, encryption configuration generator 710 may examine metadata 720 to determine the encryption scheme for the column(s), and may determine from the above described data structure whether the particular operation may be performed on the one or more columns, when encrypted according to their particular encryption schemes.

If encryption configuration generator 710 determines that parameterized query 326 does not include any operations on encrypted data that are unsupported at the data server, encryption configuration generator 710 then determines the encryption configuration for parameterized query 326. Encryption configuration generator 710 may perform this function by parsing the contents of parameterized query 326 for parameter values (e.g., indicated columns, predicate parameters, etc.), which are all potentially encrypted query items. Encryption configuration generator 710 searches metadata 720 to identify the columns corresponding to all of the potentially encrypted query items to determine their corresponding encryption schemes and keys in database 714, if any. Encryption configuration generator 710 generates the encryption configuration to indicate which parameters of query 128 are encrypted, and their corresponding encryption schemes and data encryption keys. As shown in FIG. 7, encryption configuration generator 710 generates query analysis response 328, which includes the encryption configuration.

The encryption configuration includes information configured to enable the database application to generate transformed version 330 of query 128, described further above. In an embodiment, encryption configuration generator 710 may generate the encryption configuration to include instructions for the database application to follow to generate transformed version 330, and/or may include transformations to query 128. Such instructions/transformations may include one or more of the following potential types:

(a) Encrypt a parameter value of query 128 in transformed version 330 using an encryption scheme and key indicated in the encryption configuration;

(b) Transform the data type of a parameter of query 128 in transformed version 330; and/or (c) Transform an operation of query 128 in transformed version 330.

For purposes of illustration, the parameterized version of the above example SSN-based query is repeated below:

SELECT FirstName, LastName, Base_Salary+ Annual_Bonus FROM Employees WHERE SSN=@p1

In this example, Base_Salary and Annual_Bonus are of type INT (integer) and SSN is of type CHAR (characters), SSN is encrypted in database 714 according to a deterministic encryption scheme X, and Base_Salary and Annual_Bonus are encrypted according to a partially homomorphic encryption (PHE) scheme Y.

In an embodiment, encryption configuration generator 710 may evaluate whether this example parameterized query can be evaluated on encrypted data, and if so, may generate instructions to include in the encryption configuration for this example parameterized query as follows:

(1) Determine whether the parameterized query can be evaluated on encrypted data by determining whether there any unsupported operations on encrypted data, according to the following actions:

(a) Confirm that the SSN column in database 714 is encrypted with an encryption scheme that supports the equality (=) operation. The SSN column is identified/inferred from the parameterized query. The confirmation may be performed by checking metadata 720 for the encryption scheme for SSN, which in this example is deterministic encryption scheme X. Deterministic encryption schemes do support equality, so no failure occurs with respect to the SSN column (randomized encryption schemes do not support equality, because the same encryption result is not always generated, so if the encryption scheme for SSN had been a randomized scheme, this check would have failed).

(b) Confirm that the Base_Salary and Annual_Bonus columns in database 714 are encrypted with an encryption scheme that support the addition operation. This may be performed by checking metadata 720 for the encryption scheme(s) for Base_Salary and Annual_Bonus, which in this example are PHE scheme Y. In this example, PHE scheme Y supports the addition operation, so no failure occurs with respect to the Base_Salary and Annual_Bonus columns (if PHE scheme Y did not support the addition operation, this check would have failed).

Accordingly, this example parameterized query can be evaluated on encrypted data because there are no unsupported operations on encrypted data, and thus an encryption configuration may be generated, as follows.

(2) Generate an encryption configuration with instructions:

(a) Encryption instruction: Metadata 720 indicates that the column SSN is encrypted according to encryption scheme X. Thus, create an instruction for the SSN parameter value(s) provided to data server 700 in the transformed version of query 128 to be encrypted according to encryption scheme X.

(b) Data type transformation: Base_Salary and Annual_Bonus are of type INT and SSN is of type CHAR, in query 128. However, because Base_Salary and Annual_Bonus are physically stored in database 714 in encrypted form, the data type of their encrypted versions is BINARY. Thus, an instruction may be generated to transform query 128 in the transformed version to use the encrypted data types for Base_Salary and Annual_Bonus.

(c) Perform one or more operations: Encryption configuration generator 710 may provide instructions to the database application to perform one or more arbitrary operations/functions/expressions on parameter values of query 128 in the transformed version of query 128. Any number of operations, and types of operations may be performed, including removing trailing or leading spaces, converting string data to upper (or other) case, converting a string to integer, formatting a data according to a particular date format, converting a first format of time (e.g., UTC time) to a second format of time (e.g., local time), etc. Encryption configuration generator 710 may instruct the database application to perform further types of operations as would be known to persons skilled in the relevant art(s) from the teachings herein.

Furthermore, encryption configuration generator 710 may note operation transformations to be performed by transformed query evaluator 712 on the transformed version of query 128 (and/or transformed query evaluator 712 may determine these itself). For instance, assume (for illustrative purposes) that for encryption scheme Y, the equivalent operation to addition on un-encrypted values is the multiplication of the encrypted values. Accordingly, encryption configuration generator 710 may note an instruction for transformed query evaluator 712 to transform the addition of the Base_Salary and Annual_Bonus to a multiplication of the encrypted versions of the Base_Salary and Annual_Bonus when evaluating the transformed query.

Accordingly, the encryption configuration provided to the database application in response to the above example parameterized query may include these instructions, optionally along with an encrypted copy of the encryption key for SSN.

As such, in step 606, if an encryption configuration is determined for parameterized query 326 (i.e., determined to be able to be evaluated on encrypted inputs), operation proceeds from step 606 to step 612. If there is a failure, operation proceeds from step 606 to step 608.

In step 608, an encryption configuration for a transformed version of the user query capable of being evaluated by the data server on encrypted data values was failed to be determined. As described above with respect to FIG. 6, based on an analysis of parameterized query 326, there may be a failure to determine an encryption configuration for a transformed version of query 128 capable of being evaluated by the data server on encrypted data values, due to parameterized query 128 including an operation on encrypted data that is unsupported at data server 700. Operation proceeds from step 608 to step 610.

In step 610, the database application is informed of the failing. In an embodiment, information that indicates the failure may be provided by encryption configuration generator 710 in query analysis response 328, which is transmitted by database application interface 706 to the database application. Operation of flowchart 600 ends after step 610.

In step 612, the determined encryption configuration is provided to the database application. For example, as shown in FIG. 7, the encryption configuration may be provided by encryption configuration generator 710 in query analysis response 328, which is transmitted by database application interface 706 to the database application.

Note that as described above, the database application generates a transformed version of query 128 based on the received encryption configuration (e.g., step 216 of FIG. 2). In an embodiment, the encryption configuration may indicate one or more parameter values for encryption by the database application in transformed version 330. As described above, the database application may have access to the encryption keys used to encrypt the parameter values. Alternatively, the database application may have to request copies of the data encryption keys from data server 700.

Figure 8:
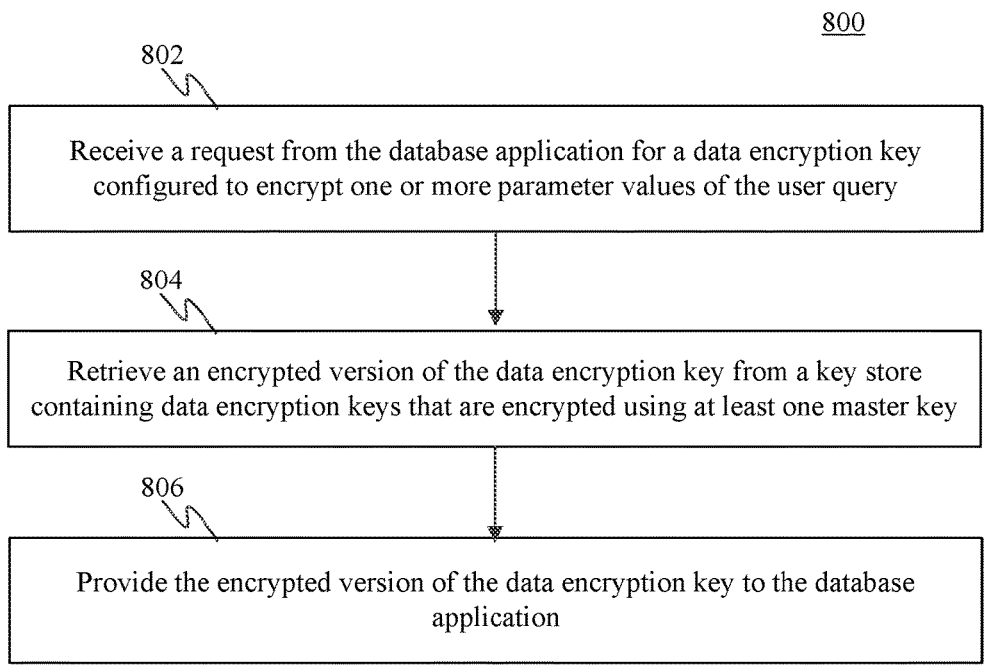
FIGS. 8 and 9 show flowcharts providing processes in a data server for servicing a request for a data encryption or decryption key by a database application, according to example embodiments.

For instance, FIG. 8 shows a flowchart 800 providing a process in a data server for servicing a request for a data encryption key by a database application, according to an example embodiment. Flowchart 800 is described as follows.

Flowchart 800 begins with step 802. In step 802, a request is received from the database application for a data encryption key configured to encrypt one or more parameter values of the user query. In an embodiment, as shown in FIG. 7, the database application may generate a key request 334 that is received and forwarded by database application interface 706 to key interface 708. As described further above, key request 334 is a request for the encryption key that was unable to be retrieved at the database application.

In step 804, an encrypted version of the data encryption key is retrieved from a key store containing data encryption keys that are encrypted using at least one master key. Key interface 708 is configured to service requests for encryption/decryption keys of key store 716, such as first and second keys 718a and 718b, for the database application. Any number of keys may be stored in key store 716. Furthermore, keys 718a and 718b (and further keys) stored in key store 716 may be encrypted using a master key available at the database application (e.g., master key 316 of FIG. 3), but not available at data server 700. In this manner, keys 718a and 718b may not be misused at data server 700 to decrypt and compromise encrypted data of database 714.

Accordingly, in response to key request 334, key interface 708 may retrieve one or more data encryption keys from key store 716 that are specified in key request 334.

In step 806, the encrypted version of the data encryption key is provided to the database application. In an embodiment, as shown in FIG. 7, key interface 708 may provide encryption key 336 (which is encrypted) to database application interface 706, which provides encryption key 336 to the database application. The database application may decrypt encryption key 336 using the master key, and may use the decrypted key to encrypt data in the transformed version of query 128, to be provided back to data server 700.

Referring back to FIG. 6, in step 614, the transformed version of the user query is received from the database application. For example, as shown in FIG. 7, transformed version 330 of user query 128 is received from the database application by database application interface 310, and forwarded to transformed query evaluator 712. In an embodiment, transformed version 330 includes one or more encrypted parameter values, which were encrypted according to the encryption configuration transmitted to the database application in query analysis response 328. Transformed version 330 optionally includes instructions for the database application, as described above. Operation proceeds from step 614 to step 616.

Note that in an embodiment, step 614 may include a process of verifying the transformed version of the user query. Such verification may be performed by transformed query evaluator 712 to confirm that transformed version 330 of user query 128 is executable. Any suitable type(s) of verification may be performed, including checking a syntax of transformed version 330 for correctness, comparing transformed version 330 to parameterized query 326 to confirm a relation to the same user query 128, checking that all of the instructions in the encryption configuration were performed at the database application, checking that the types of encryption used for the parameters in transformed version 330 matches the encryption of corresponding columns in database 714 (e.g., by referring to metadata 720), and/or any by performing any other sorts or types of verifications. If transformed version 330 has errors during verification, transformed query evaluator 712 may communicate with the database application to request a correction be made to transformed version 330.

In step 616, the transformed version of the user query is evaluated to generate results. In an embodiment, transformed query evaluator 712 evaluates transformed version 330 to generate query results. In an embodiment, transformed query evaluator 712 evaluates transformed version 330 in a similar manner as a query engine may evaluate a conventional received query, such as by retrieving any columns, which may be encrypted or not encrypted, corresponding to parameter values (which may be encrypted or not encrypted) of transformed version 330, performing operations on the columns and/or parameter values, which may include permissible operations on encrypted values and/or may include transforming operations on parameter values (e.g., performing multiplication of encrypted values instead of addition of the unencrypted values), and generating query results as defined by the query, which may include encrypted data. Operation proceeds from step 616 to step 618.

In step 618, the results are provided to the database application along with metadata indicating at least one data decryption key configured to decrypt at least a portion of the results. For example, as shown in FIG. 7, transformed query evaluator 712 generates evaluated query results 332, which includes information indicating the results of the evaluating of transformed version 330. Evaluated query results 332 is provided to database application interface 706, which transmits evaluated query results 332 to the database application.

In an embodiment, transformed query evaluator 712 may also include metadata in evaluated query results 332 that indicates the data types of the original parameters (of query 128), indicates which query results data is encrypted, and indicates an encryption scheme and key for decrypting the encrypted data. In this manner, the database application may decrypt any portion of evaluated query results 332 that is encrypted (e.g., step 222 of FIG. 2) into the corresponding data type, before providing query results 130 to the requestor (e.g., step 224 of FIG. 2).

As described above, the database application may have access to the decryption keys used to decrypt the query results. Alternatively, the database application may have to request copies of the data decryption keys from data server 700.

Figure 9:
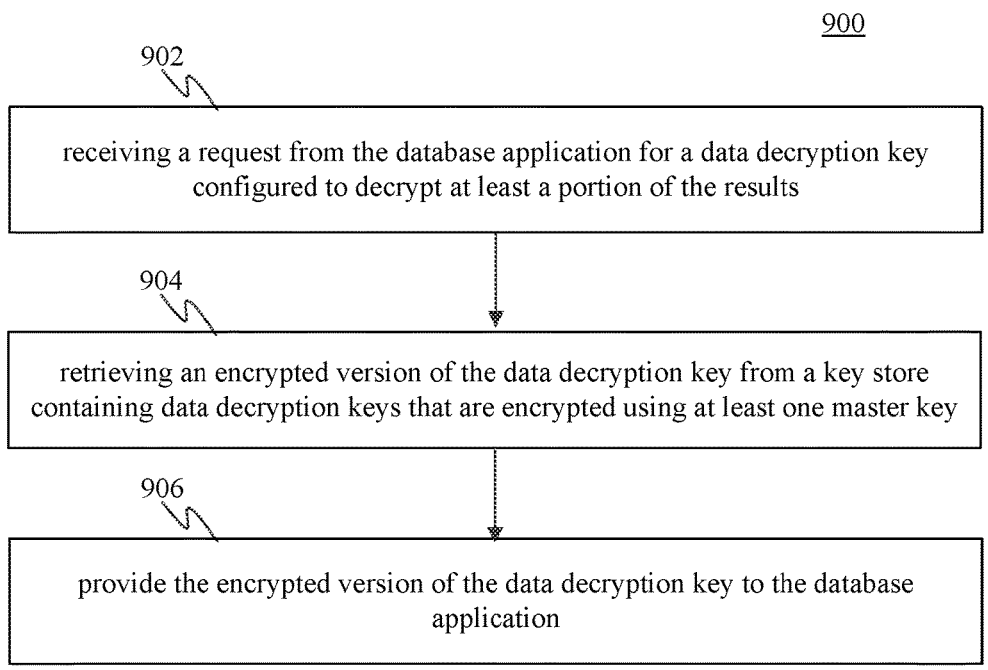

For instance, FIG. 9 shows a flowchart 900 providing a process in a data server for servicing a request for a data decryption key by a database application, according to an example embodiment. Flowchart 900 is described as follows.

Flowchart 900 begins with step 902. In step 902, a request is received from the database application for a data decryption key configured to decrypt at least a portion of the results. The database application may generate key request 338, which is received and forwarded by database application interface 706 to key interface 708. As described above, key request 338 is a request for a decryption key that was unable to be retrieved at the database application.

In step 904, an encrypted version of the data decryption key is retrieved from a key store containing data decryption keys that are encrypted using at least one master key. In response to key request 338, key interface 708 may retrieve one or more data decryption keys from key store 716 that are specified in key request 338.

In step 906, the encrypted version of the data decryption key is provided to the database application. In an embodiment, as shown in FIG. 7, key interface 708 may provide decryption key 340 (which is encrypted) to database application interface 706, which provides decryption key 340 to the database application. The database application may decrypt decryption key 340 using the master key, and may use the decrypted key to decrypt data of evaluated query results 332.

C. Example Encryption Configuration Generator Embodiments

In embodiments, such as described in the subsection above, query processor 702 may include encryption configuration generator 710, which is configured to generate an encryption configuration for a parameterized query. The encryption configuration indicates the encryption schemes to be used for parameters (and variables, if any) of the query. The encryption configuration may be provided to a client to be used to generate an encrypted query that may be securely operated on by data server 700. Encryption configuration generator 710 may operate in various ways and be configured in various ways to perform such functions.

Figure 10:
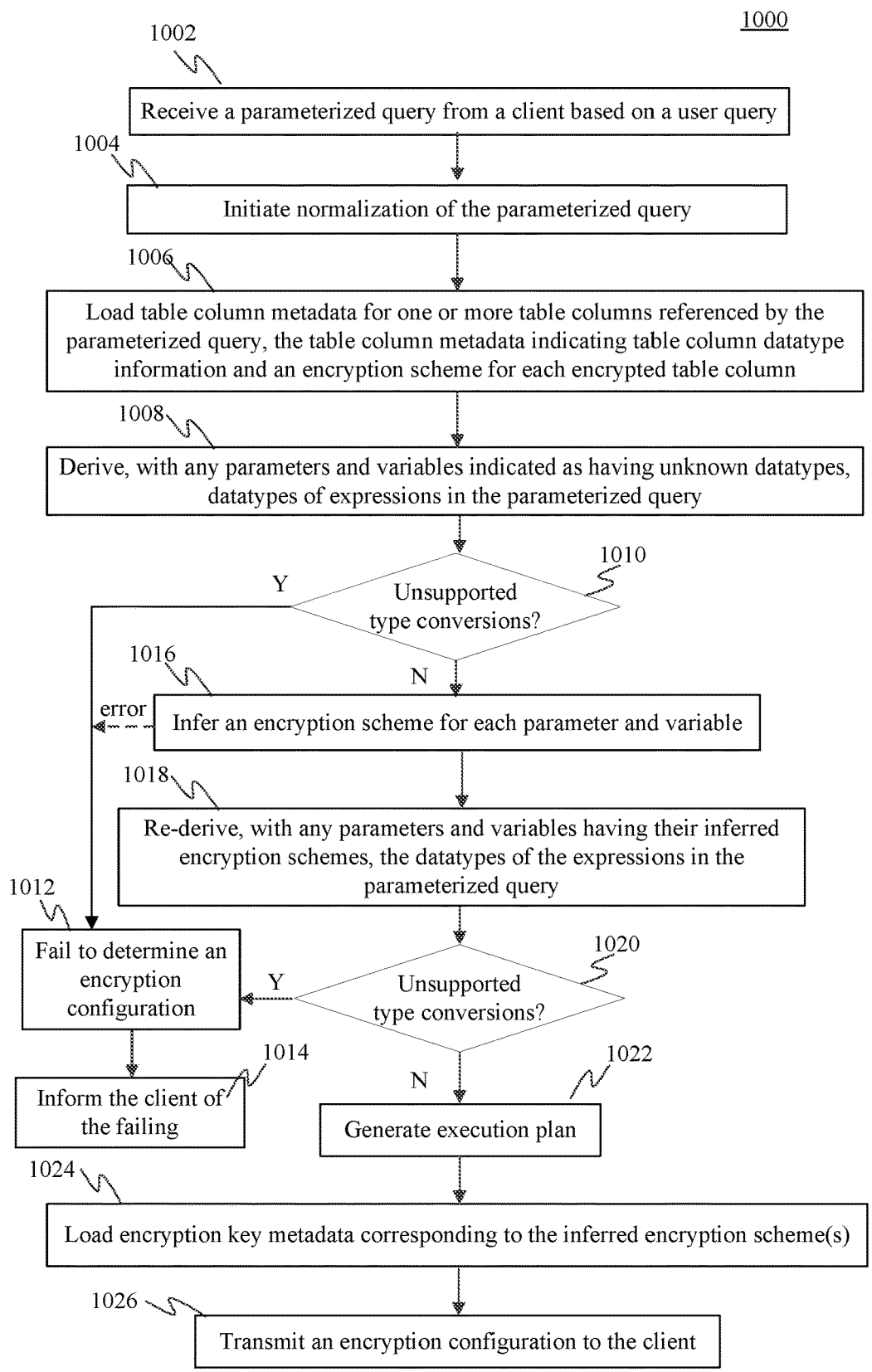
FIG. 10 shows a flowchart providing a process in a data server for preparing a user query for secure processing, according to an example embodiment.
Figure 11:
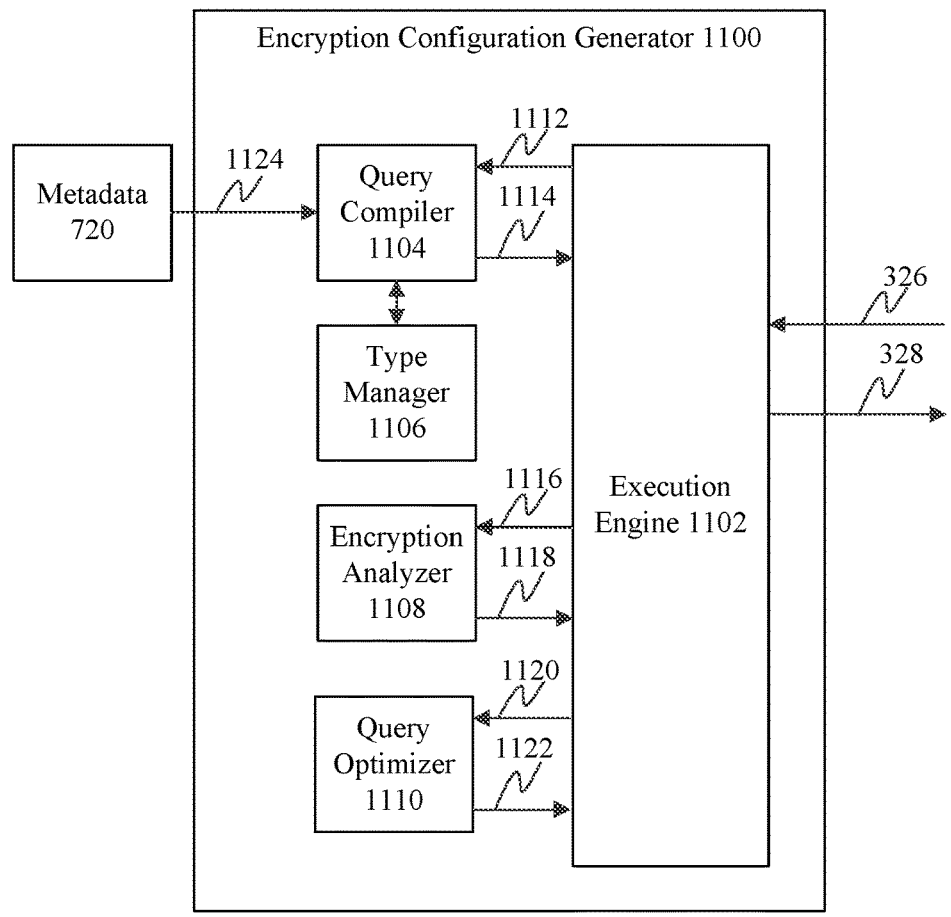
FIG. 11 shows a block diagram of an encryption configuration generator configured to generate an encryption configuration based on a parameterized user query, according to an example embodiment.

For instance, FIG. 10 shows a flowchart 1000 providing a process in a data server for preparing a user query for secure processing, according to an example embodiment. Encryption configuration generator 710 may operate according to flowchart 1000 in an embodiment. For illustrative purposes, flowchart 1000 is described below with respect to FIG. 11. FIG. 11 shows a block diagram of an encryption configuration generator 1100 configured to generate an encryption configuration based on a parameterized user query, according to an example embodiment. Encryption configuration generator 1100 is an example of encryption configuration generator 710 of FIG. 7. As shown in FIG. 11, encryption configuration generator 1100 includes an execution engine 1102, a query compiler 1104, a type manager 1106, an encryption analyzer 1108, and a query optimizer 1110. Encryption configuration generator 1100 and flowchart 1000 are described as follows. It is noted that the steps of flowchart 1000 do not necessarily have to occur in the order shown in FIG. 10, but may occur in other orders.

Flowchart 1000 of FIG. 10 begins with step 1002. In step 1002, a parameterized query is received from a client based on a user query. For example, as shown in FIG. 7, database application interface 706 of data server 700 receives parameterized query 326 (e.g., from database application 106 in FIG. 1, or database application 300 of FIG. 3), and forwards parameterized query 326 to encryption configuration generator 710. As shown in FIG. 11, execution engine 1102 of encryption configuration generator 1100 may receive and process parameterized query 326.

As described above, parameterized query 326 is a modified version of query 128, which is directed at data stored in database 714 (FIG. 7). Parameterized query 326 includes dummy values in place of the actual parameter values of query 128, so that sensitive data is not provided to the data server. Operation proceeds from step 1002 to step 1004.

In step 1004, normalization of the parameterized query is initiated. In an embodiment, execution engine 1102 is configured to control generation of an execution plan for parameterized query 326. Accordingly, execution engine 1102 is configured to initiate the normalization of parameterized query 326. Prior to normalization, execution engine 1102 may parse parameterized query 326 to determine its contents, including objects such as parameters, variables, expressions, and/or referenced data (e.g., tables). Normalization is a phase of query compilation that occurs after parsing and may involve (a) binding, which is the resolving of the objects referenced by parameterized query 326 to the actual database objects (i.e., is the object a table, how many columns does the table have, etc.), and (b) performing datatype derivation, which is the process of deriving (determining) the datatype of the result of each expression of the query based on the datatypes of the expression operands. For example, the output datatype of the expression (A+B) is INTEGER if the parameters A and B are both INTEGER datatypes, or is STRING if the parameters A and B are both STRING datatypes.

In an embodiment, execution engine 1102 is configured to call or instruct other logic to perform the binding and the datatype derivation as part of normalization, such as query compiler 1104 and/or type manager 1106. Note that in one embodiment, execution engine 1102 may contain (as internal logic) one or more of query compiler 1104, type manager 1106, encryption analyzer 1108, and/or query optimizer 1110 of FIG. 11. Alternatively, as shown in FIG. 11, one or more of query compiler 1104, type manager 1106, encryption analyzer 1108, and/or query optimizer 1110 may be logic separate from execution engine 1102. Still further, one or more of type manager 1106, encryption analyzer 1108, and/or query optimizer 1110 may be internal to query compiler 1104, or may be separate from query compiler 1104 (as shown in FIG. 11). In FIG. 10, operation proceeds from step 1004 to step 1006.

In step 1006, table column metadata is loaded for one or more table columns referenced by the parameterized query, the table column metadata indicating table column datatype information and an encryption scheme for each encrypted table column. In an embodiment, execution engine 1102 is configured to instruct query compiler 1104 to retrieve metadata for parameterized query 326, including metadata indicating a datatype for data stored in each referenced table column, and encryption metadata describing any encrypted table columns referenced by parameterized query 326.

For example, as shown in FIG. 11, query compiler 1104 may access metadata 720 for table column metadata 1124 corresponding to table columns referenced by parameterized query 326. In an embodiment, metadata 720 includes datatype information for all columns of tables stored in database 714 (FIG. 7), and further includes encryption metadata for all encrypted columns of tables in database 714. The datatype information describes the (unencrypted) data stored in the table columns, such as INTEGER, STRING, BINARY, etc. The encryption metadata indicates how each encrypted column of the tables is encrypted by indicating a corresponding encryption scheme. For instance, in an embodiment, each indicated encryption scheme for a column table includes an encryption key identifier, an encryption type, and an encryption algorithm, which are described as follows.

The encryption key identifier identifies an encryption key for the encryption scheme associated with a table column. The encryption key has a value (e.g., numerical or alphanumeric) that is an input to the encryption algorithm and specifies the transformation of plaintext to ciphertext (encryption) and of ciphertext to plaintext (decryption). The encryption algorithm is the algorithm/scheme used to encrypt the data in the table column. Many types of encryption algorithms exist, such as AES (Advanced Encryption Standard) 256 (256 bits) CBC (cipher block chaining) and others.

The encryption type indicates a type of encryption, such as deterministic or randomized, used to store the encrypted table column at the data server. As described above, randomized encryption is a strong type of encryption, which for a same plaintext value and encryption key results in a different ciphertext value (e.g., because of a random Initialization Vector (IV) used by the randomized encryption algorithm). With randomized encryption, the encrypted values may be retrieved and decrypted (e.g., at the client) to acquire the plaintext value, but expressions that operate on randomized encrypted values cannot be evaluated because of the different ciphertext values being generated for a same plaintext value. Furthermore, as described above, deterministic encryption is a less secure type of encryption, where the encryption of the same plaintext value with a same encryption key always results in the same ciphertext value. Accordingly, deterministic encryption can be used to evaluate the equality of first and second values (because the encrypted versions of the first and second values, when encrypted according to a same deterministic encryption algorithm and key, will be the same if the first and second values are the same), which means embodiments can support parameterized query 326 including operations such as point lookups, equi-joins, GROUP BYs, distinct, and further operations that are based on an equality function.

Note that in an embodiment, metadata 720 stores table column metadata (datatypes and encryption metadata) in a non-encrypted form, while database 714 stores the physical data of table columns in binary form (encrypted). Accordingly, encryption configuration generator 1100 is enabled to use both types of data (dual-type system) to generate an execution plan.

Accordingly, query compiler 1104 retrieves table column metadata 1124 to determine, for each referenced table column, the unencrypted data type of the data in the table column (e.g., INTEGER, STRING, BINARY, etc.), which may include the length, precision, scale collation, etc., for the column data, as well as the encryption scheme for any encrypted columns. In FIG. 10, operation proceeds from step 1006 to step 1008.

In step 1008, datatypes of expressions in the parameterized query are derived with any parameters and variables indicated as having unknown datatypes. In an embodiment, type manager 1106 is configured to derive/determine the datatypes of any expressions in parameterized query 326 based on the datatypes of the inputs to the expressions, which may be parameters, variables, and/or table column data. Step 1008 is an initial assessment of expression datatypes, performed in a "soft" (relaxed) manner, where the encrypted datatypes of some parameters and/or variables may be unknown, because their encryption may depend on the way they are used. For example, if a parameter (e.g., a SSN) is to be applied against an encrypted column, the parameter may need to be encrypted in a same manner as the data in the encrypted column. Until it is determined whether the parameter needs to be encrypted, the encryption datatype of that parameter is considered unknown. In an embodiment, in this first assessment of step 1008, any expressions dependent on unknown datatypes may be allowed to pass without their datatype being evaluated, whereas step 1018 (described below) is a second assessment of expression data types, performed in a "strict" manner, where encrypted datatypes of parameters and/or variable have been inferred (in step 1016), and therefore the datatypes of all expressions can be fully evaluated.

It is noted that if parameterized query 326 does not address encrypted data in database 714, the second assessment of expression data types need not be performed. However, if parameterized query 326 does address encrypted data in database 714, step 1016 is performed to infer encrypted datatypes for parameters and/or variables, and step 1018 is performed to derive the datatypes of expressions in parameterized query 326 based on the inferred, encrypted datatypes.

Accordingly, type manager 1106 extracts the datatypes, which may include encrypted datatypes, for the table columns addressed by parameterized query 326 from table column metadata 1124 retrieved by query compiler 1104. In an embodiment, each encrypted table columns has an encrypted datatype, such as "VARBINARY", which indicates the table column is encrypted, and further has a datatype for the underlying (unencrypted) data, such as "INTEGER," "STRING," etc.

Furthermore, during this first assessment/compilation, type manager 1106 indicates the encrypted datatypes of any parameters and variables of parameterized query 326 as "unknown," since it has not yet been determined what encryption will be required for the parameters and variables. However, the parameters and variables do still carry their user defined (unencrypted) datatypes, such as "INTEGER", "STRING," etc., since these are known.

Still further, type manager 1106 performs step 1008 to determine the datatypes of expressions of parameterized query 326 in a relaxed manner, such that type manager 1106 does not fail or insert unnecessary type conversions because of a type mismatch. The datatype information for expressions with inputs that are unknown is indicated as "encryption unknown," and type manager 1106 ignores any underlying datatype conversion. Whenever a datatype conversion is required for an expression between a datatype that is unknown (pending inference, as further described above and below) and an encrypted datatype, type manager 1106 indicates the expression as "requiring encryption", so a current query execution plan that is usable cannot be generated at this point in time. This guarantees that incorrect query execution plans cannot be generated by relaxing the type system as is done in step 1008.

In FIG. 10, operation proceeds from step 1008 to step 1010.

In step 1010, whether any unsupported type conversions are included in the parameterized query is determined. In an embodiment, when performing step 1008, type manager 1106 determines whether parameterized query 326 includes any expressions that dictate unsupported type conversions. For example, if parameterized query 326 includes an expression (A+B), where A is a DATE datatype and B is an INTEGER datatype, a datatype conversion (e.g., DATE to INTEGER or INTEGER to DATE) may be required to evaluate the expression, abut such a datatype conversion may be unsupported (e.g., due to the conversion corrupting or losing data, such as by overflow, etc.). As is further described below, there is a limited set of supported type conversions. Type manager 1106 may be configured to analyze parameterized query 326 for any type conversions not included in the supported set, and to fail parameterized query 326 if any such unsupported type conversions are detected.

Table column data is already encrypted at the data server, and thus has an encrypted type at the data server. There is a limited set of datatype conversions that can be supported on encrypted types. Because it cannot be validated whether a conversion leads to an overflow, truncation, etc. all supported conversions of encrypted types have to be safe (e.g., smaller type to larger type, etc.). Because plaintext values are not available for manipulation at the data server, a datatype conversion is only logical (is assessed, but not actually performed at the data server) and can be performed if the ciphertext is identical for the data value before and after conversion.

Accordingly, when deriving expression datatypes in step 1008, type manager 1106 analyzes parameterized query 326 for type conversions, including checking whether each type conversion is supported, and in step 1010, produces a failure if an unsupported conversion is detected. Because the datatype conversions are logical (not actually performed), a CONVERT operator is not necessary in the data server, but instead the datatype conversions may actually be performed by the client.

In an embodiment, the client may normalize the relevant values before sending them to the data server. For example, a SMALLINT value, which is normally 2 bytes, may be first cast into a BIGINT value and then encrypted before providing to the server in transformed version 330 (FIG. 7). This allows logically converting a SMALLINT into a BIGINT on the data server side.

The following is an example list of supported conversions that may be performed on encrypted types, provided for purposes of illustration. In further embodiments, additional and/or fewer supported conversions may exist:

TINYINT, SMALLINT, INT, BIGINT from smaller type to larger;
SMALLMONEY to MONEY;
CHAR to VARCHAR and vice versa, where the target type has equal or greater length;
NCHAR to NVARCHAR and vice versa, where the target type has equal or greater length;
BINARY to VARBINARY and vice versa, where the target type has equal or greater length;
TIME to TIME with equal or greater scale;
DATETIME2 to DATETIME2 with equal or greater scale;
DATETIMEOFFSET to DATETIMEOFFSET with equal or greater scale.

In an embodiment, a datatype conversion not included in this list may be failed by type manager 1106. Furthermore, for a datatype conversion between two encrypted objects to be valid, type manager 1106 has to determine that all attributes of the encryption scheme (encryption key, encryption algorithm, encryption type) match exactly between the two encrypted objects.

Note that in an embodiment, type manager 1106 may not allow converting an unencrypted VARBINARY datatype into an encrypted datatype. This is done to avoid corrupting an encrypted table by accidentally inserting unencrypted data. In such an embodiment, any user defined values can only be used (e.g., INSERTs, predicates, etc.) against encrypted columns if they came through proper communication channels and have been properly flagged as encrypted, using the appropriate CEKs (content encryption keys), etc.

In FIG. 11, type manager 1106 communicates its results to query compiler 1104, and query compiler 1104 provides processed query results 1114 to execution engine 1102. In FIG. 10, if any unsupported type conversions were determined by type manager 1106 to be present, operation proceeds from step 1010 to step 1012. If no unsupported type conversions were determined present by type manager 1106, operation proceeds from step 1010 to step 1016.

In step 1012, an encryption configuration was failed to be determined. A failure to determine an encryption configuration for parameterized query 326 may occur if an unsupported type conversion is detected by type manager 1106, an error in inferring an encryption scheme is determined by query analyzer 1108, etc. Operation proceeds from step 1012 to step 1014.

In step 1014, the client is informed of the failing. In an embodiment, information that indicates the failure may be provided by execution engine 1102 in query analysis response 328, which is transmitted by database application interface 706 to the client, which may then optionally provide notice of the failure to the database application. Operation of flowchart 1000 ends after step 1014.

In step 1016, an encryption scheme is inferred for each parameter and variable of the parameterized query to generate an inferred encryption scheme set. In an embodiment, execution engine 1102 (or query compiler 1104) calls or instructs encryption analyzer 1108 to perform one or more traversals of the expression tree representative of parameterized query 326 to collect constraints that will allow inference of the encryption of each parameter (and variable). For example, if a parameter is used in a predicate against an encrypted column WHERE t.SSN=@SSN, the parameter @SSN needs to be encrypted with the same encryption (scheme and key) as the SSN column in table t (represented as "t.SSN"). Accordingly, in this case, encryption analyzer 1108 sets the encryption datatype, including the encryption scheme and encryption key, for the parameter to match that of the table column.

If a certain column or parameter is used in an expression/ operator that is not supported by the encryption scheme, for example ORDER BY <encrypted column>, encryption analyzer 1108 raises the appropriate error, and operation may proceed from step 1016 to step 1012 in flowchart 1000 of FIG. 10 (as indicated by dotted line).

For statements that are not queries, encryption analyzer 1108 may include logic for analyzing such a statement to track parameter usage. For example, if a parameter is used in a DBCC (database console commands) command, the parameter must be in plaintext.

Accordingly, as shown in FIG. 11, encryption analyzer 1108 receives inference inputs 1116, which may include parameterized query 326 (e.g., the query tree form of parameterized query 326 generated by the binding process), as well as relevant metadata from metadata 720. Encryption analyzer 1108 is configured to deduce the encryption scheme for each parameter and local variable in the query (or batch of queries) based on how the parameters/variables are used, and to fail the query if there are operations that cannot be supported with the defined encryption schemes. For example, for a query "SELECT * FROM employees WHERE SSN=@SSN", where the SSN table column is encrypted with deterministic encryption, encryption analyzer 1108 infers that the variable/parameter @SSN needs to be encrypted with the same encryption scheme as the SSN column and also deterministic encryption has to be used, because an equality operation is performed (i.e., SSN=@SSN). Because the SSN column uses deterministic encryption, the query constraints are satisfied and our analysis will respond with an inferred encryption scheme for the @SSN parameter/variable, which is the same encryption scheme as the SSN column. Alternatively, if the SSN column was encrypted with randomized encryption, then the constraints would not be satisfied and encryption analyzer 1108 would fail the query with the appropriate error.

Figure 12:
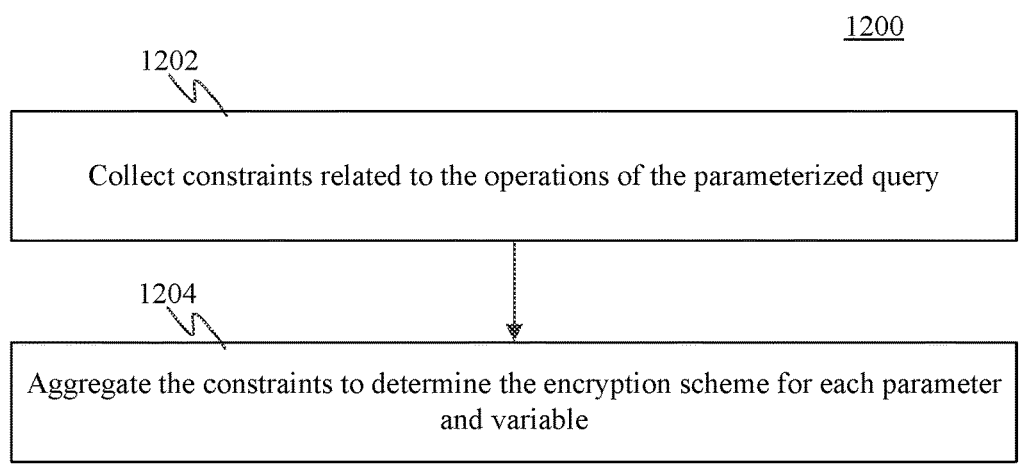
FIG. 12 shows a flowchart providing a process in a data server for inferring an encryption scheme for each parameter and variable of a parameterized query, according to an example embodiment.

Encryption analyzer 1108 may operate in various ways to infer encryption schemes for parameters and variables of a parameterized query. For instance, FIG. 12 shows a flowchart 1200 providing a process in a data server for inferring an encryption scheme for each parameter and variable of a parameterized query, according to an example embodiment. Encryption analyzer 1108 may operate according to flowchart 1200 in an embodiment. Flowchart 1200 is described as follows.

Flowchart 1200 begins with step 1202. In step 1202, constraints are collected related to the operations of the parameterized query. In an embodiment, encryption analyzer 1108 is configured, for each received query, to traverse the query tree (generated during the binding process described above) bottom-up and analyze each operator and expression to collect "constraints". Examples of such constraints include:

For an equality operation, both children of the expression need to have the same encryption scheme and need to be at most deterministically encrypted;

For an addition operation, assuming that no encryption scheme supports addition, both children of the expression need to be in plaintext (encryption not allowed); and For a GROUP BY operation, all columns used in the GROUP BY clause need to be at most deterministically encrypted so that the equality can be evaluated.

In an embodiment, encryption analyzer 1108 is configured to collect constraints according to the algorithm/rules described below in 1-6. Encryption analyzer 1108 collects constraints from the query(s) and eventually aggregates them to identify whether the query can be supported and what is the encryption scheme for each parameter or local variable. For query statements, the algorithm is executed after the query tree has been bound and traverses the entire tree bottom-up visiting all expressions of the query to identify constraints for all parameters and columns.

While traversing the query tree, encryption analyzer 1108 collects constraints based on the following rules:

1. When visiting a column reference in the query tree, register a constraint that the encryption scheme of the column should be the encryption scheme indicated in metadata 720.

2. When visiting a parameter/variable, register that the encryption scheme is not known yet and that its encryption type can be randomized encryption. Eventually, encryption analyzer 1108 assigns an encryption type to the parameter/variable depending on the operations in which the parameter/variable is involved.

3. When visiting an equality operation (including implicit equalities such as GROUP BY, etc.), encryption analyzer 1108 registers constraints that (a) the encryption scheme of all sub-expressions must be the same, and (b) the encryption algorithm attribute should not be stronger than deterministic encryption.

4. When visiting an assignment (including INSERT/UPDATE), encryption analyzer 1108 registers the constraint that the encryption scheme of the left hand side and right hand side are the same.

5. When visiting set operations (e.g., intersection, union, etc.), encryption analyzer 1108 registers constraints that the encryption scheme of corresponding source columns and the output column must be the same.

6. When visiting other operators such as ORDER BY, SORT, SUM, etc., encryption analyzer 1108 registers constraints that parameters used in predefined user defined fields (UDFs) etc. use an encryption scheme of cleartext.

In sum, encryption analyzer 1108 registers from the following set of constraints:

(a) The encryption scheme of two expressions needs to be the same.

(b) The encryption scheme of an expression needs to be weaker than a specific encryption scheme.

(c) The encryption scheme of an expression is already known and fixed.

Figure 13:
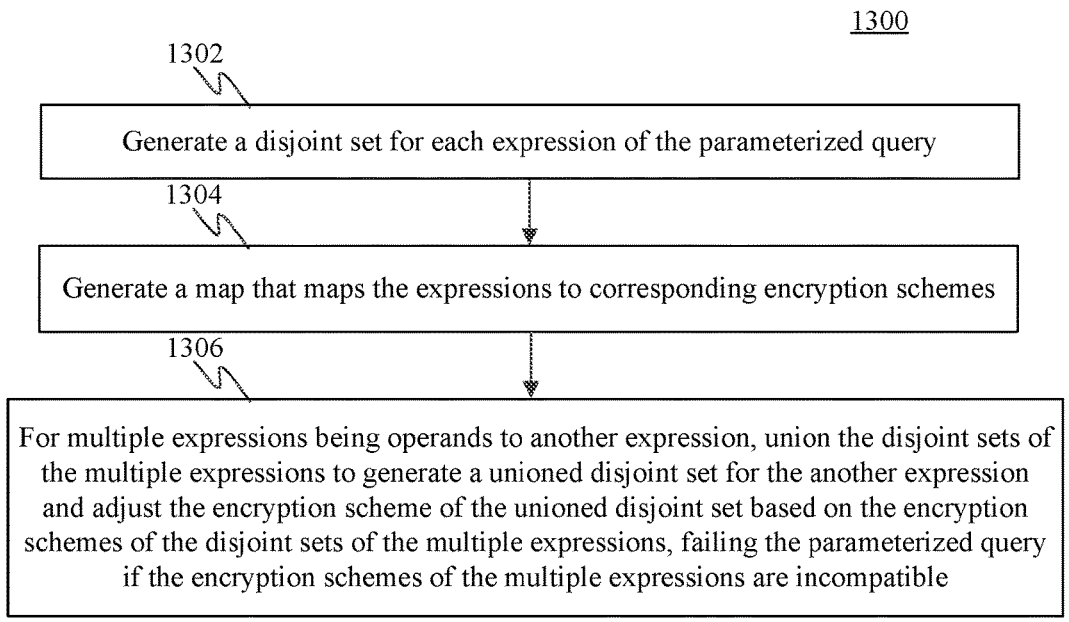
FIG. 13 shows a flowchart providing a process in a data server for storing collected constraints related to inferred encryption schemes for parameters and variables, according to an example embodiment.

Encryption analyzer 1108 may store the constraints determined for expressions in various ways. For instance, FIG. 13 shows a flowchart 1300 providing a process in a data server for storing collected constraints related to inferred encryption schemes for parameters and variables, according to an example embodiment. With reference to flowchart 1300, encryption analyzer 1108 may store constraints in two data structures:

In step 1302 of flowchart 1300, a disjoint set is generated for each expression of the parameterized query. Encryption analyzer 1108 may be configured to generate a disjoint set D (union find-data structure) for each expression of parameterized query 326. A disjoint set is a collection of elements such that each element belongs to one and only one set. A disjoint set supports three operations: MAKESET, UNION, AND FIND. MAKESET creates a new singleton set for a given element. FIND checks if an element exists in the disjoint set, and if it does, it returns an element representing the set that it belongs to. UNION merges the sets corresponding to two elements in the disjoint set into one set. Accordingly, parameterized query 326 (e.g., the bound tree) is parsed for expressions, and each time an expression is found for the first time, a new disjoint set is created for the expression with just the expression included in the disjoint set.

In step 1304, a map that maps the expressions to corresponding encryption schemes is generated. Encryption analyzer 1108 may be configured to generate a map M from expressions to their encryption schemes. The map tracks the encryption scheme for each disjoint set generated in step 1302. For example, if an expression is a reference to a table column that has deterministic encryption with encryption Key1, the map is modified to indicate that this encryption scheme for the disjoint set corresponding to the expression. In another example, the map may include a mapping of an expression SSN=ASSN to a corresponding encryption scheme AES 256 CBC and a corresponding encryption key.

In step 1306, for multiple expressions that are operands to another expression, union the disjoint sets of the multiple expressions to generate a unioned disjoint set for the another expression and adjust the encryption scheme of the unioned disjoint set based on the encryption schemes of the disjoint sets of the multiple expressions, failing the parameterized query if the encryption schemes of the multiple expressions are incompatible. In an embodiment, encryption analyzer 1108 is configured to determine whenever multiple expressions are operands to another expression of parameterized query 326. In such case encryption analyzer 1108 performs a UNION (merge) of their corresponding disjoint sets, and adjusts the encryption scheme of the resulting disjoint set based on the encryption scheme of each individual set and the encryption required by the operation. If the encryption schemes cannot be reconciled, encryption analyzer 1108 fails the operation and parameterized query 326.

For example, for the expression "Column1=@Parameter1" in a parameterized query: Encryption analyzer 1108 determines the expression for Column1 and creates a disjoint set for it, marking the encryption of the disjoint set in the map (e.g., deterministic, encryption Key1). Encryption analyzer 1108 determines the expression for @Parameter1 and creates a disjoint set for it, marking the @Parameter as Unknown in the map (because the encryption for parameters is not yet known). Encryption analyzer 1108 determines the expression "Column1=@Parameter1", which contains multiple expressions, causing encryption analyzer 1108 to merge the two previous disjoint sets generated for Column1 and @Parameter1, and to apply in the map the restriction/constraint that they can only be "Determinist" or Plaintext since we want to evaluate equality.

Both of the disjoint set D and map M data structures use an equality comparer for comparing two expressions, which has two cases:

1. If both expressions are identifiers, compare the corresponding identifier references; or
2. Otherwise compare expression pointers.

In an embodiment, encryption analyzer 1108 may enforce the constraints (a)-(c) listed above using the following example logic:

For type (a) constraints, encryption scheme x=encryption schemey, encryption analyzer 1108 merges the sets containing expressions x and y. Then, if there is an encryption scheme that satisfies both sets (MEET of the encryption scheme of x and y), the encryption scheme of the resulting set is set to the satisfying encryption scheme:

Let z=Union(x, y), and
Compute T=meet of M[x] and M[y]. If T exists, set M[z]=T else raise error.

For type (b) constraints, encryption scheme x<T, encryption analyzer 1108 calculates a MEET of the existing type of an expression:

Compute T'=meet (M[x], T), and
If T' exists, set M[x]=T', else raise error.

For type (c) constraints, encryption scheme x=T, encryption analyzer 1108 sets the encryption scheme for x to be T if it doesn't exist in M already. Otherwise, encryption analyzer 1108 check that the encryption scheme is T:

If M[x] does not contain x, M[X]=T else Assert (M[x]=T).

After each statement is processed, M[x] is the inferred encryption scheme for expression x. As a final result, encryption analyzer 1108 generates a map from parameters/variables to their corresponding encryption schemes as inferred encryption schemes.

Referring back to FIG. 12, in step 1204, the constraints are aggregated to determine the encryption scheme for each parameter and variable. In an embodiment, if parameterized query 326 is received as a batch of query statements, and after encryption analyzer 1108 has collected constraints for all query statements in the batch, encryption analyzer 1108 is configured to aggregate the constraints to infer the encryption schemes for all parameters and local variables across the queries. All parameters/variables start with their encryption scheme being "unknown" and are restricted as constraints are applied. This analysis may potentially trigger additional errors. For example, if a variable is used in two operations that have different encryption schemes in two different query statements, encryption analyzer 1108 may raise an error. The same parameter cannot be unencrypted and have deterministic encryption at the same time. Since columns have a fixed encryption scheme, defined in metadata 720, their encryption schemes are not adjusted, and any constraints that do not match their encryption scheme may cause a conflict, raising an error. If all constraints can be satisfied, the analysis performed by encryption analyzer 1108 has successfully inferred the encryption scheme for all parameters/variables and compilation can now store these as part of the execution plan.

Figure 14:
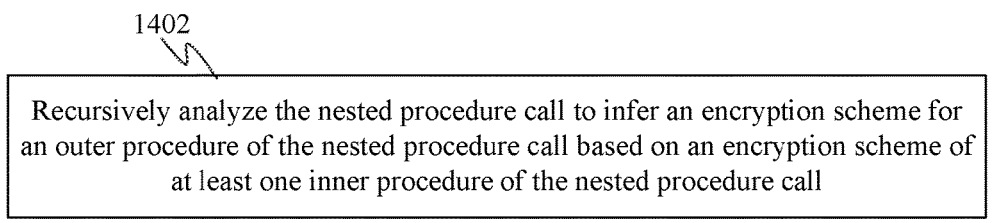
FIG. 14 shows a process for analyzing nested procedure calls to infer an encryption scheme, according to an example embodiment.

Note that in an embodiment, parameterized query 326 may include nested procedure calls. FIG. 14 shows a step 1402 for analyzing nested procedure calls to infer an encryption scheme, according to an example embodiment. In an embodiment, encryption analyzer 1108 may operate according to step 1402. In step 1402, a nested procedure call is recursively analyzed to infer an encryption scheme for an outer procedure of the nested procedure call based on an encryption scheme of at least one inner procedure of the nested procedure call. In an embodiment, when there is a nested procedure/module call, the encryption metadata inferred for the parameters of the inner procedure call might affect the encryption metadata of the parameters/variables of the outer procedure. For example, if proc1 (@i, @i) calls proc2 (@j), passing parameter @j through, and proc2 needs parameter @j to be encrypted with deterministic encryption and encryption Key1, then encryption analyzer 1108 may infer that parameter @j of the outer procedure also needs to be encrypted with this same encryption scheme.

Accordingly, encryption analyzer 1108 is configured to analyze modules/procedure calls recursively so that the encryption scheme of the outermost procedure can be inferred. Encryption analyzer 1108 recursively analyzes the inner procedures before the outermost procedures, and uses the encryption schemes of the inner procedures for the analysis of the outer procedures.

As shown in FIG. 11, encryption analyzer 1108 outputs inferred parameters and variables 1118, which is received by execution engine 1102. In FIG. 10, operation proceeds from step 1016 to step 1018.

In step 1018, the datatypes of the expressions in the parameterized query are re-derived with any parameters and variables having their inferred encryption schemes. As described above, query compiler 1104 instructs or calls type manager 1106 type manager 1106 to perform a second, stricter derivation of the datatypes of expressions of parameterized query 326 now that encryption analyzer 1108 has inferred the encryption schemes of parameters and variables. Accordingly, in this second assessment, the datatype of all parameters and local variable is swapped from "unknown" to their inferred encryption datatypes, such as VARBINARY as the encrypted type plus the underlying unencrypted type for the corresponding parameter/variable. During this phase, all datatypes are indicated as "encryption known", so that type manager 1106 applies the strict type checking. No expressions are passed on as in the first assessment described above (step 1008), but instead each expression has its datatype re-determined based upon its inputs. Because this procedure is otherwise the same in step 1018 as described above with respect to step 1008, the procedure is not repeated here for reasons of brevity. Operation proceeds from step 1018 to step 1020.

In step 1020, whether any unsupported type conversions are included in the parameterized query is determined. Similar to step 1010 described above, in an embodiment, type manager 1106 to determine whether parameterized query 326 includes any unsupported type conversions, this time based on the datatypes inferred in step 1016. As described above, there may be a limited set of type conversions that may be supported (e.g., converting BINARY type to VARBINARY type). Type manager 1106 may be configured to analyze parameterized query 326 for any unsupported type conversions, and to fail parameterized query 326 if any unsupported type conversions are detected.

Because this procedure is otherwise the same in step 1020 as described above with respect to step 1010, the procedure is not repeated here for reasons of brevity. If any unsupported type conversions are determined to be present, operation proceeds from step 1020 to step 1012. If no unsupported type conversions are present, operation proceeds from step 1020 to step 1016.

In step 1022, an encryption plan is generated. In an embodiment, query optimizer 1110 may receive an execution plan generation request 1120 from execution engine 1102, and in response, may generate an execution plan 1122 for parameterized query 326. Execution plan 1102 can operate directly on the encrypted data received from the client (e.g., received in step 614 of FIG. 6). More specifically, execution plan 1122 can operate on the binary data that is stored in database 714 (FIG. 7) for encrypted data. Encryption plan 1102 specifies an order of table column accesses to database 714, and an order of evaluations of the expressions of parameterized query 326, to be performed to generate a query result. In an embodiment, transformed query evaluator 712 (FIG. 7) receives and executes execution plan 1122 in response to receiving transformed version 330 from the client.

In step 1024, encryption key metadata corresponding to the inferred encryption scheme set is loaded. After the encryption scheme has been inferred for each parameter by encryption analyzer 1108, execution engine 1102 may retrieve the related encryption key information from metadata 720. The retrieved encryption keys may be returned to the client with query analysis response 328 (in step 1026), or separately, such as in response to a request from the client.

In step 1026, an encryption configuration is transmitted to the client. For example, as shown in FIG. 11, the encryption configuration may be provided by encryption configuration generator 1100 in query analysis response 328, which may be transmitted by database application interface 706 (FIG. 7) to the client in a similar manner as described elsewhere herein.

As described above, encryption analyzer 1108 collects information from parameterized query 326, which may be a batch of query statements, to infer the encryption metadata for parameters and variables. However, schema/metadata locks (on metadata in metadata 72) may be released after each query statement is analyzed, so there is no guarantee that the inferences performed by encryption analyzer 1108 are completed using consistent metadata. For instance, if metadata changes for a table column during the compilation of a batch of query statements, there is a chance that the encryption metadata for a parameter will be inferred incorrectly. This means that we might:

(1) Incorrectly fail queries that are normally supported;

(2) Incorrectly infer that there is no encryption metadata and use the original plan; and/or (3) Incorrectly infer the encryption metadata and start the second phase of compilation with wrong metadata.

Figure 15:
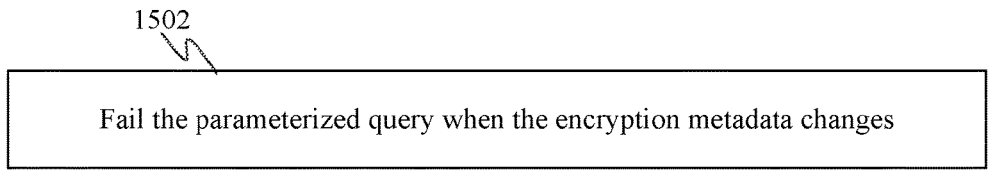
FIG. 15 shows a process for handling inconsistent metadata, according to an example embodiment.

Cases (2) and (3) can actually cause the query to be executed with incorrect semantics, potentially corrupting the database. Accordingly, embodiments are configured to ensure that inconsistent metadata does not lead to such problems. FIG. 15 shows a step 1502 for handling inconsistent metadata, according to an example embodiment. In an embodiment, type manager 1106 and/or encryption analyzer 1108 may operate according to step 1502 when processing a query to avoid problems with inconsistent metadata. In step 1502, the parameterized query is failed when the encryption metadata changes.

For example, the encryption inference performed by encryption analyzer 1108, followed by the strong type checking performed by type manager 1106 during the second phase of compilation (steps 1018 and 1020) can guarantee that any queries that have been compiled with incorrect metadata will be rejected and cannot be executed with incorrect semantics or corrupt the database.

In more detail, cases (1) and (3) are caught by the strong type checks performed by type manager 1106, whereas case (2) is caught by the recompilation of the query, since the metadata was changed while the query was being compiled. Upon a failure in step 1502, encryption analyzer 1108 may identify that the inference of the subject parameter or variable has been invalidated due to a schema/metadata change, and may restart the inferring process (step 1016 of FIG. 10). Accordingly, the disclosed type system and type derivation process enforce the semantic correctness of queries on encrypted data by failing unsupported operations and conversions on encrypted data.

III. Example Mobile and Stationary Device Embodiments

Query processing system 102, data server 104, database application 106, first user device 108*a*, second user device 108*b*, query processor 112, database client 114, application 116*a*, application 116*b*, database application 300, database client 302, database client engine 304, decrypter 306, encrypter 308, data server interface 310, query parameterizer 320, transformed query generator 322, results processor 324, data server 700, query processor 702, database application interface 706, key interface 708, encryption configuration generator 710, transformed query evaluator 712, encryption configuration generator 1100, execution engine 1102, query compiler 1104, type manager 1106, encryption analyzer 1108, query optimizer 1110, flowchart 200, flowchart 400, flowchart 500, flowchart 600, flowchart 800, flowchart 900, flowchart 1000, flowchart 1200, flowchart 1300, step 1402, and step 1502 may be implemented in hardware, or hardware combined with software and/or firmware. For example, query processing system 102, data server 104, database application 106, query processor 112, database client 114, application 116*a*, application 116*b*, database application 300, database client 302, database client engine 304, decrypter 306, encrypter 308, data server interface 310, query parameterizer 320, transformed query generator 322, results processor 324, data server 700, query processor 702, database application interface 706, key interface 708, encryption configuration generator 710, transformed query evaluator 712, encryption configuration generator 1100, execution engine 1102, query compiler 1104, type manager 1106, encryption analyzer 1108, query optimizer 1110, flowchart 200, flowchart 400, flowchart 500, flowchart 600, flowchart 800, flowchart 900, flowchart 1000, flowchart 1200, flowchart 1300, step 1402, and/or step 1502 may be implemented as computer program code/instructions configured to be executed in one or more processors and stored in a computer readable storage medium. Alternatively, query processing system 102, data server 104, database application 106, query processor 112, database client 114, application 116*a*, application 116*b*, database application 300, database client 302, database client engine 304, decrypter 306, encrypter 308, data server interface 310, query parameterizer 320, transformed query generator 322, results processor 324, data server 700, query processor 702, database application interface 706, key interface 708, encryption configuration generator 710, transformed query evaluator 712, encryption configuration generator 1100, execution engine 1102, query compiler 1104, type manager 1106, encryption analyzer 1108, query optimizer 1110, flowchart 200, flowchart 400, flowchart 500, flowchart 600, flowchart 800, flowchart 900, flowchart 1000, flowchart 1200, flowchart 1300, step 1402, and/or step 1502 may be implemented as hardware logic/electrical circuitry.

For instance, in an embodiment, one or more, in any combination, of query processing system 102, data server 104, database application 106, query processor 112, database client 114, application 116a, application 116b, database application 300, database client 302, database client engine 304, decrypter 306, encrypter 308, data server interface 310, query parameterizer 320, transformed query generator 322, results processor 324, data server 700, query processor 702, database application interface 706, key interface 708, encryption configuration generator 710, transformed query evaluator 712, encryption configuration generator 1100, execution engine 1102, query compiler 1104, type manager 1106, encryption analyzer 1108, query optimizer 1110, flowchart 200, flowchart 400, flowchart 500, flowchart 600, flowchart 800, flowchart 900, flowchart 1000, flowchart 1200, flowchart 1300, step 1402, and/or step 1502 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 16:
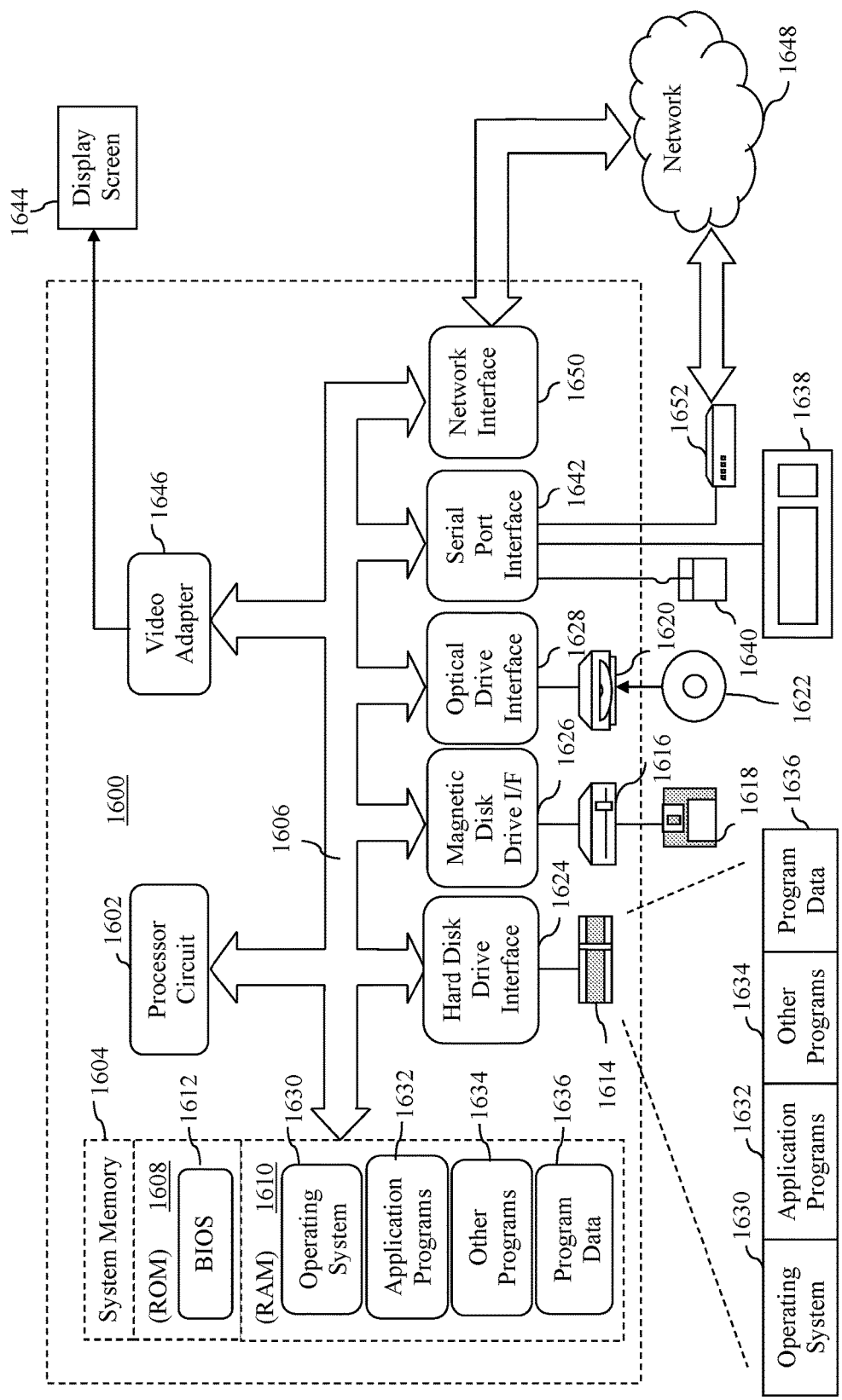
FIG. 16 shows a block diagram of an example computing device that may be used to implement embodiments.

FIG. 16 depicts an exemplary implementation of a computing device 1600 in which embodiments may be implemented. For example, data server 104, database application 106, first user device 108a, second user device 108b, database application 300, and/or data server 700 may be implemented in one or more computing devices similar to computing device 1600 in stationary computer embodiments, including one or more features of computing device 1600 and/or alternative features. The description of computing device 1600 provided herein is provided for purposes of illustration, and is not intended to be limiting. Embodiments may be implemented in further types of computer systems, as would be known to persons skilled in the relevant art(s).

As shown in FIG. 16, computing device 1600 includes one or more processors, referred to as processor circuit 1602, a system memory 1604, and a bus 1606 that couples various system components including system memory 1604 to processor circuit 1602. Processor circuit 1602 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1602 may execute program code stored in a computer readable medium, such as program code of operating system 1630, application programs 1632, other programs 1634, etc. Bus 1606 represents one or more of any of several types of bus structures, including a memory bus or memory controller, a peripheral bus, an accelerated graphics port, and a processor or local bus using any of a variety of bus architectures. System memory 1604 includes read only memory (ROM) 1608 and random access memory (RAM) 1610. A basic input/output system 1612 (BIOS) is stored in ROM 1608.

Computing device 1600 also has one or more of the following drives: a hard disk drive 1614 for reading from and writing to a hard disk, a magnetic disk drive 1616 for reading from or writing to a removable magnetic disk 1618, and an optical disk drive 1620 for reading from or writing to a removable optical disk 1622 such as a CD ROM, DVD ROM, or other optical media. Hard disk drive 1614, magnetic disk drive 1616, and optical disk drive 1620 are connected to bus 1606 by a hard disk drive interface 1624, a magnetic disk drive interface 1626, and an optical drive interface 1628, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1630, one or more application programs 1632, other programs 1634, and program data 1636. Application programs 1632 or other programs 1634 may include, for example, computer program logic (e.g., computer program code or instructions) for implementing query processing system 102, data server 104, database application 106, query processor 112, database client 114, application 116a, application 116b, database application 300, database client 302, database client engine 304, decrypter 306, encrypter 308, data server interface 310, query parameterizer 320, transformed query generator 322, results processor 324, data server 700, query processor 702, database application interface 706, key interface 708, encryption configuration generator 710, transformed query evaluator 712, encryption configuration generator 1100, execution engine 1102, query compiler 1104, type manager 1106, encryption analyzer 1108, query optimizer 1110, flowchart 200, flowchart 400, flowchart 500, flowchart 600, flowchart 800, flowchart 900, flowchart 1000, flowchart 1200, flowchart 1300, step 1402, and/or step 1502 (including any suitable step of flowcharts 200, 400, 500, 600, 800, 900, 1000, 1200, 1300), and/or further embodiments described herein.

A user may enter commands and information into the computing device 1600 through input devices such as keyboard 1638 and pointing device 1640. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1602 through a serial port interface 1642 that is coupled to bus 1606, but may be connected by other interfaces, such as a parallel port, game port, or a universal serial bus (USB).

A display screen 1644 is also connected to bus 1606 via an interface, such as a video adapter 1646. Display screen 1644 may be external to, or incorporated in computing device 1600. Display screen 1644 may display information, as well as being a user interface for receiving user commands and/or other information (e.g., by touch, finger gestures, virtual keyboard, etc.). In addition to display screen 1644, computing device 1600 may include other peripheral output devices (not shown) such as speakers and printers.

Computing device 1600 is connected to a network 1648 (e.g., the Internet) through an adaptor or network interface 1650, a modem 1652, or other means for establishing communications over the network. Modem 1652, which may be internal or external, may be connected to bus 1606 via serial port interface 1642, as shown in FIG. 16, or may be connected to bus 1606 using another interface type, including a parallel interface.

As used herein, the terms "computer program medium," "computer-readable medium," and "computer-readable storage medium" are used to refer to physical hardware media such as the hard disk associated with hard disk drive 1614, removable magnetic disk 1618, removable optical disk 1622, other physical hardware media such as RAMs, ROMs, flash memory cards, digital video disks, zip disks, MEMs, nanotechnology-based storage devices, and further types of physical/tangible hardware storage media (including memory 1220 of FIG. 12). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1632 and other programs 1634) may be stored on the hard disk, magnetic disk, optical disk, ROM, RAM, or other hardware storage medium. Such computer programs may also be received via network interface 1650, serial port interface 1642, or any other interface type. Such computer programs, when executed or loaded by an application, enable computing device 1600 to implement features of embodiments discussed herein. Accordingly, such computer programs represent controllers of the computing device 1600.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

In one embodiment, a method is provided in a data server implemented in at least one computing device for preparing a user query for secure processing at the data server, comprising: receiving a parameterized query from a client, the parameterized query being a parameterized version of a user query received by the client from a user application; loading table column metadata for one or more table columns referenced by the parameterized query, the table column metadata indicating table column datatype information and an encryption scheme for each encrypted table column; deriving, with any parameters and variables of the parameterized query indicated as having unknown datatypes, datatypes of expressions in the parameterized query; determining any unsupported datatype conversions in the parameterized query; inferring an encryption scheme for any parameters and variables of the parameterized query to generate an inferred encryption scheme set; re-deriving, with any parameters and variables of the parameterized query having their inferred encryption schemes, the datatypes of expressions in the parameterized query; and transmitting to the client an encryption configuration that includes the inferred encryption scheme for any parameters and variables.

In an embodiment, the method further comprises: storing table column metadata in a non-encrypted form; and storing physical data of table columns in binary form.

In an embodiment, the inferring comprises: collecting constraints related to the operations of the parameterized query; and aggregating the constraints to determine the encryption scheme for each parameter and variable.

In an embodiment, the collecting comprises: generating a disjoint set for each expression of the parameterized query; generating a map that maps the expressions to corresponding encryption schemes; and for each instance of multiple expressions being operands to another expression of the parameterized query, unioning the disjoint sets of the multiple expressions to generate a unioned disjoint set for the another expression, adjusting the encryption scheme of the unioned disjoint set based on the encryption schemes of the disjoint sets of the multiple expressions, and failing the parameterized query if the encryption schemes of the multiple expressions are incompatible.

In an embodiment, the method further comprises: loading encryption key metadata corresponding to the inferred encryption scheme set; and transmitting the encryption key metadata to the client.

In an embodiment, the parameterized query includes a nested procedure call, and said inferring comprises: recursively analyzing the nested procedure call to infer an encryption scheme for an outer procedure of the nested procedure call based on an encryption scheme of at least one inner procedure of the nested procedure call.

In an embodiment, the compiling comprises: failing the parameterized query when the encryption metadata changes.

In another embodiment, a data server, comprises: at least one processor circuit; and at least one memory that stores program code configured to be executed by the at least one processor circuit, the program code comprising: an execution engine configured to receive a parameterized query from a client, the parameterized query being a parameterized version of a user query received by the client from a user application; a query compiler configured to perform normalization, including type derivation, for the parameterized query, and to load table column metadata for one or more table columns referenced by the parameterized query, the table column metadata indicating table column datatype information and an encryption scheme for each encrypted table column; a type manager configured to derive, with any parameters and variables of the parameterized query indicated as having unknown datatypes, datatypes of expressions in the parameterized query, and to determine any unsupported datatype conversions in the parameterized query; and an encryption analyzer configured to infer an encryption scheme for any parameters and variables of the parameterized query to generate an inferred encryption scheme set; wherein the type manager is configured to re-derive, with any parameters and variables of the parameterized query having their inferred encryption schemes, the datatypes of expressions in the parameterized query; the execution engine is further configured to transmit to the client an encryption configuration that includes the inferred encryption scheme for any parameters and variables.

In an embodiment, encryption analyzer is configured to infer encryption schemes at least by collecting constraints related to the operations of the parameterized query, and aggregate the constraints to determine the encryption scheme for each parameter and variable.

In an embodiment, to collect constraints, the encryption analyzer is configured to at least generate a disjoint set for each expression of the parameterized query, generating a map that maps the expressions to corresponding encryption schemes, and for each instance of multiple expressions being operands to another expression of the parameterized query, unioning the disjoint sets of the multiple expressions to generate a unioned disjoint set for the another expression, adjusting the encryption scheme of the unioned disjoint set based on the encryption schemes of the disjoint sets of the multiple expressions, and failing the parameterized query if the encryption schemes of the multiple expressions are incompatible.

In an embodiment, the execution engine is further configured to load encryption key metadata corresponding to the inferred encryption scheme set and transmit the encryption key metadata to the client.

In an embodiment, the parameterized query includes a nested procedure call, and the encryption analyzer is configured to recursively analyze the nested procedure call to infer an encryption scheme for an outer procedure of the nested procedure call based on an encryption scheme of at least one inner procedure of the nested procedure call.

In an embodiment, the type manager is configured to fail the parameterized query when the encryption metadata changes.

In an embodiment, the method further comprises: a query optimizer configured to generate an execution plan to operate on encrypted data with respect to a transformed version of the user query received from the client, generated at the client based on the transmitted encryption configuration.

In an embodiment, the method further comprises: a transformed query analyzer configured to receive the transformed version of the user query from the client, the transformed version of the user query including one or more encrypted parameter values, evaluate the transformed version of the user query to generate results, and provide the results to the client.

In another embodiment, a data server comprises: at least one processor circuit; and a memory that stores program code configured to be executed by the at least one processor circuit to perform operations, the operations including: receiving a parameterized query from a client, the parameterized query being a parameterized version of a user query received by the client from a user application; loading table column metadata for one or more table columns referenced by the parameterized query, the table column metadata indicating table column datatype information and an encryption scheme for each encrypted table column; deriving, with any parameters and variables of the parameterized query indicated as having unknown datatypes, datatypes of expressions in the parameterized query; determining any unsupported datatype conversions in the parameterized query; inferring an encryption scheme for any parameters and variables of the parameterized query to generate an inferred encryption scheme set; re-deriving, with any parameters and variables of the parameterized query having their inferred encryption schemes, the datatypes of expressions in the parameterized query; and transmitting to the client an encryption configuration that includes the inferred encryption scheme for any parameters and variables.

In an embodiment, the inferring comprises: collecting constraints related to the operations of the parameterized query; and aggregating the constraints to determine the encryption scheme for each parameter and variable.

In an embodiment, the collecting comprises: generating a disjoint set for each expression of the parameterized query; generating a map that maps the expressions to corresponding encryption schemes; and for each instance of multiple expressions being operands to another expression of the parameterized query, unioning the disjoint sets of the multiple expressions to generate a unioned disjoint set for the another expression, adjusting the encryption scheme of the unioned disjoint set based on the encryption schemes of the disjoint sets of the multiple expressions, and failing the parameterized query if the encryption schemes of the multiple expressions are incompatible.

In an embodiment, the parameterized query includes a nested procedure call, and said inferring comprises: recursively analyzing the nested procedure call to infer an encryption scheme for an outer procedure of the nested procedure call based on an encryption scheme of at least one inner procedure of the nested procedure call.

In an embodiment, the compiling comprises: failing the parameterized query when the encryption metadata changes.

In an embodiment, the compiling further comprises: enforcing a semantic correctness of queries on encrypted data by failing unsupported operations and conversions on encrypted data.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a data server implemented in at least one computing device for preparing a user query for secure processing at the data server, comprising:
   receiving a parameterized query from a client, the parameterized query being a parameterized version of a user query received by the client from a user application;
   loading table column metadata for one or more table columns referenced by the parameterized query, the table column metadata indicating table column datatype information and an encryption scheme for each encrypted table column;
   deriving, with any parameters and variables of the parameterized query indicated as having unknown datatypes, datatypes of expressions in the parameterized query;
   determining any unsupported datatype conversions in the parameterized query;
   inferring an encryption scheme for any parameters and variables of the parameterized query to generate an inferred encryption scheme set;
   re-deriving, with any parameters and variables of the parameterized query having their inferred encryption schemes, the datatypes of expressions in the parameterized query; and
   transmitting to the client an encryption configuration that includes the inferred encryption scheme for any parameters and variables.

2. The method of claim 1, further comprising:
storing table column metadata in a non-encrypted form; and
storing physical data of table columns in binary form.

3. The method of claim 1, wherein said inferring comprises:
collecting constraints related to the operations of the parameterized query; and
aggregating the constraints to determine the encryption scheme for each parameter and variable.

4. The method of claim 3, wherein said collecting comprises:
generating a disjoint set for each expression of the parameterized query;
generating a map that maps the expressions to corresponding encryption schemes; and
for each instance of multiple expressions being operands to another expression of the parameterized query,
unioning the disjoint sets of the multiple expressions to generate a unioned disjoint set for the another expression,
adjusting the encryption scheme of the unioned disjoint set based on the encryption schemes of the disjoint sets of the multiple expressions, and
failing the parameterized query if the encryption schemes of the multiple expressions are incompatible.

5. The method of claim 1, further comprising:
loading encryption key metadata corresponding to the inferred encryption scheme set; and
transmitting the encryption key metadata to the client.

6. The method of claim 1, wherein the parameterized query includes a nested procedure call, and said inferring comprises:
recursively analyzing the nested procedure call to infer an encryption scheme for an outer procedure of the nested procedure call based on an encryption scheme of at least one inner procedure of the nested procedure call.

7. The method of claim 1, wherein said compiling comprises:
failing the parameterized query when the encryption metadata changes.

8. A data server, comprising:
at least one processor circuit; and
at least one memory that stores program code configured to be executed by the at least one processor circuit, the program code comprising:
an execution engine configured to receive a parameterized query from a client, the parameterized query being a parameterized version of a user query received by the client from a user application;
a query compiler configured to perform normalization, including type derivation, for the parameterized query, and to load table column metadata for one or more table columns referenced by the parameterized query, the table column metadata indicating table column datatype information and an encryption scheme for each encrypted table column;
a type manager configured to derive, with any parameters and variables of the parameterized query indicated as having unknown datatypes, datatypes of expressions in the parameterized query, and to determine any unsupported datatype conversions in the parameterized query; and
an encryption analyzer configured to infer an encryption scheme for any parameters and variables of the parameterized query to generate an inferred encryption scheme set;
wherein the type manager is configured to re-derive, with any parameters and variables of the parameterized query having their inferred encryption schemes, the datatypes of expressions in the parameterized query;
the execution engine is further configured to transmit to the client an encryption configuration that includes the inferred encryption scheme for any parameters and variables.

9. The data server of claim 8, wherein the encryption analyzer is configured to infer encryption schemes at least by collecting constraints related to the operations of the parameterized query, and aggregate the constraints to determine the encryption scheme for each parameter and variable.

10. The data server of claim 9, wherein to collect constraints, the encryption analyzer is configured to at least generate a disjoint set for each expression of the parameterized query, generating a map that maps the expressions to corresponding encryption schemes, and for each instance of multiple expressions being operands to another expression of the parameterized query, unioning the disjoint sets of the multiple expressions to generate a unioned disjoint set for the another expression, adjusting the encryption scheme of the unioned disjoint set based on the encryption schemes of the disjoint sets of the multiple expressions, and failing the parameterized query if the encryption schemes of the multiple expressions are incompatible.

11. The data server of claim 8, wherein the execution engine is further configured to load encryption key metadata corresponding to the inferred encryption scheme set and transmit the encryption key metadata to the client.

12. The data server of claim 8, wherein the parameterized query includes a nested procedure call, and the encryption analyzer is configured to recursively analyze the nested procedure call to infer an encryption scheme for an outer procedure of the nested procedure call based on an encryption scheme of at least one inner procedure of the nested procedure call.

13. The data server of claim 8, wherein the type manager is configured to fail the parameterized query when the encryption metadata changes.

14. The data server of claim 8, further comprising:
a query optimizer configured to generate an execution plan to operate on encrypted data with respect to a transformed version of the user query received from the client, generated at the client based on the transmitted encryption configuration; and
a transformed query analyzer configured to receive the transformed version of the user query from the client, the transformed version of the user query including one or more encrypted parameter values, evaluate the transformed version of the user query to generate results, and provide the results to the client.

15. A data server, comprising:
at least one processor circuit; and
a memory that stores program code configured to be executed by the at least one processor circuit to perform operations, the operations including:
receiving a parameterized query from a client, the parameterized query being a parameterized version of a user query received by the client from a user application;
loading table column metadata for one or more table columns referenced by the parameterized query, the table column metadata indicating table column datatype information and an encryption scheme for each encrypted table column;

deriving, with any parameters and variables of the parameterized query indicated as having unknown datatypes, datatypes of expressions in the parameterized query;

determining any unsupported datatype conversions in the parameterized query;

inferring an encryption scheme for any parameters and variables of the parameterized query to generate an inferred encryption scheme set;

re-deriving, with any parameters and variables of the parameterized query having their inferred encryption schemes, the datatypes of expressions in the parameterized query; and transmitting to the client an encryption configuration that includes the inferred encryption scheme for any parameters and variables.

16. The data server of claim 15, wherein said inferring comprises:

collecting constraints related to the operations of the parameterized query; and aggregating the constraints to determine the encryption scheme for each parameter and variable.

17. The data server of claim 16, wherein said collecting comprises:

generating a disjoint set for each expression of the parameterized query;

generating a map that maps the expressions to corresponding encryption schemes; and for each instance of multiple expressions being operands to another expression of the parameterized query, unioning the disjoint sets of the multiple expressions to generate a unioned disjoint set for the another expression, adjusting the encryption scheme of the unioned disjoint set based on the encryption schemes of the disjoint sets of the multiple expressions, and failing the parameterized query if the encryption schemes of the multiple expressions are incompatible.

18. The data server of claim 15, wherein the parameterized query includes a nested procedure call, and said inferring comprises:

recursively analyzing the nested procedure call to infer an encryption scheme for an outer procedure of the nested procedure call based on an encryption scheme of at least one inner procedure of the nested procedure call.

19. The data server of claim 15, wherein said compiling comprises:

failing the parameterized query when the encryption metadata changes.

20. The data server of claim 19, wherein said compiling further comprises:

enforcing a semantic correctness of queries on encrypted data by failing unsupported operations and conversions on encrypted data.

* * * * *